United States Patent
Murata et al.

(10) Patent No.: US 11,482,251 B2
(45) Date of Patent: Oct. 25, 2022

(54) ALUMINUM ALLOY SUBSTRATE FOR MAGNETIC DISK AND METHOD FOR MANUFACTURING SAME, ALUMINUM ALLOY BASE DISK FOR MAGNETIC DISK AND METHOD FOR MANUFACTURING SAME, AND MAGNETIC DISK AND METHOD FOR MANUFACTURING THE SAME

(71) Applicants: UACJ CORPORATION, Tokyo (JP); FURUKAWA ELECTRIC CO., LTD., Tokyo (JP)

(72) Inventors: Takuya Murata, Tokyo (JP); Kotaro Kitawaki, Tokyo (JP); Makoto Yonemitsu, Tokyo (JP); Hideyuki Hatakeyama, Tokyo (JP); Ryo Sakamoto, Tokyo (JP); Hiroki Ota, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/296,610

(22) PCT Filed: Oct. 25, 2019

(86) PCT No.: PCT/JP2019/041970
§ 371 (c)(1),
(2) Date: May 25, 2021

(87) PCT Pub. No.: WO2020/110544
PCT Pub. Date: Jun. 4, 2020

(65) Prior Publication Data
US 2021/0358520 A1  Nov. 18, 2021

(30) Foreign Application Priority Data
Nov. 26, 2018 (JP) .............................. JP2018-220750

(51) Int. Cl.
*G11B 5/73* (2006.01)
*G11B 5/84* (2006.01)
(Continued)

(52) U.S. Cl.
CPC .......... *G11B 5/73919* (2019.05); *C22C 21/10* (2013.01); *C22F 1/04* (2013.01); *G11B 5/73913* (2019.05)

(58) Field of Classification Search
CPC ... G11B 5/73919; G11B 5/73913; G11B 5/82; C23C 18/18; C23C 18/21; C23C 18/32;
(Continued)

(56) References Cited

U.S. PATENT DOCUMENTS

| 5,437,746 A | 8/1995 | Usui et al. |
| 5,939,164 A | 8/1999 | Kubo et al. |

(Continued)

FOREIGN PATENT DOCUMENTS

| CN | 104109783 A | 10/2014 |
| CN | 108368568 A | 8/2018 |

(Continued)

OTHER PUBLICATIONS

English machine translation of Ban et al., WO 2018-143177, Aug. 9, 2018, pp. 1-18. (Year: 2018).*

(Continued)

*Primary Examiner* — Holly Rickman
(74) *Attorney, Agent, or Firm* — Greer, Burns & Crain, Ltd.

(57) ABSTRACT

An aluminum alloy substrate for a magnetic disk including an aluminum alloy containing 0.1 to 3.0 mass % of Fe, 0.005 to 1.000 mass % of Cu, and 0.005 to 1.000 mass % of Zn, with a balance of Al and inevitable impurities, wherein in an outer peripheral surface thereof, the number of holes having maximum diameters of 10 µm or more is 200/mm$^2$ or less, (Continued)

an aluminum alloy base disk for a magnetic disk and a magnetic disk, using the aluminum alloy substrate, and methods for manufacturing these.

9 Claims, 6 Drawing Sheets

(51) Int. Cl.
   *G11B 5/858* (2006.01)
   *C22C 21/10* (2006.01)
   *C22F 1/04* (2006.01)

(58) Field of Classification Search
   CPC .. C23C 18/36; C22C 2/10; C22C 2/12; C22C 2/14; C22C 2/18; C22C 2/00; C22F 1/04; C22F 1/00; C22F 1/20
   See application file for complete search history.

(56) References Cited

U.S. PATENT DOCUMENTS

| | | | |
|---|---|---|---|
| 10,767,247 B2 * | 9/2020 | Murata | ............... C23C 18/1844 |
| 2017/0327930 A1 | 11/2017 | Kitawaki et al. | |
| 2019/0066724 A1 | 2/2019 | Nakamura et al. | |
| 2019/0390304 A1 | 12/2019 | Murata et al. | |
| 2020/0377984 A1 | 12/2020 | Kitawaki et al. | |
| 2021/0012801 A1 * | 1/2021 | Murata | ............... C23C 18/1637 |
| 2021/0065742 A1 | 3/2021 | Kitawaki et al. | |

FOREIGN PATENT DOCUMENTS

| | | | |
|---|---|---|---|
| JP | 04030325 A | 2/1992 | |
| JP | 09235640 A | 9/1997 | |
| JP | 11175963 A | 7/1999 | |
| JP | 2006302358 A | 11/2006 | |
| JP | 5872322 B2 | 3/2016 | |
| JP | 2017110273 A | 6/2017 | |
| JP | 6389546 B1 | 9/2018 | |
| JP | 6402229 B1 | 10/2018 | |
| JP | 6437583 B2 | 12/2018 | |
| WO | 2016068293 A1 | 5/2016 | |
| WO | 2018143177 A1 | 8/2018 | |
| WO | 2018155237 A1 | 8/2018 | |

OTHER PUBLICATIONS

Japanese office action issued in corresponding Japanese patent application No. 2018-220750, dated Feb. 22, 2019 (with machine translation).

ISR issued in Int'l. application No. PCT/JP2019/041970, dated Dec. 24, 2019 (with translation).

Office Action issued in corresponding Chinese patent application No. 201980076852.X, dated Sep. 27, 2021.

* cited by examiner

ALUMINUM ALLOY SUBSTRATE FOR MAGNETIC DISK AND METHOD FOR MANUFACTURING SAME, ALUMINUM ALLOY BASE DISK FOR MAGNETIC DISK AND METHOD FOR MANUFACTURING SAME, AND MAGNETIC DISK AND METHOD FOR MANUFACTURING THE SAME

This is a National Phase Application filed under 35 U.S.C. § 371, of International Application No. PCT/JP2019/041970, filed Oct. 25, 2019, the contents of which are incorporated by reference.

TECHNICAL FIELD

The present disclosure relates to an aluminum alloy base disk for a magnetic disk, which is small in disk flutter and reduced in abnormal portions on an electroless Ni—P plated front surface thereof, and a method for manufacturing the same, an aluminum alloy substrate used for manufacturing the aluminum alloy base disk, and a method for manufacturing the same, and a magnetic disk using the aluminum alloy base disk and a method for manufacturing the same.

BACKGROUND ART

Aluminum alloy magnetic disk substrates used for storage devices of computers and data centers are manufactured using substrates that have a favorable platability and excellent mechanical characteristics and workability. For example, a magnetic disk is manufactured from a substrate which is based on an aluminum alloy according to HS 5086 (containing 3.5 mass % or more and 4.5 mass % or less of Mg, 0.50 mass % or less of Fe, 0.40 mass % or less of Si, 0.20 mass % or more and 0.70 mass % or less of Mn, 0.05 mass % or more and 0.25 mass % or less of Cr, 0.10 mass % or less of Cu, 0.15 mass % or less of Ti, and 0.25 mass % or less of Zn, with a balance of Al and inevitable impurities).

A general aluminum alloy magnetic disk is manufactured by first producing an annular aluminum alloy substrate, plating the aluminum alloy substrate, and then applying a magnetic substance on a surface of the aluminum alloy substrate.

For example, an aluminum alloy magnetic disk using the above-mentioned HS 5086 alloy is manufactured according to the following manufacturing steps: First, an aluminum alloy material having a desired chemical composition is cast into an ingot, and the ingot is hot rolled after being subjected to homogenization treatment, and then cold-rolled, to produce a rolled material having a thickness required for the magnetic disk. It is preferable to anneal the rolled material, for example, during the cold rolling, as required. Then, the rolled material is stamped to form annular sheets, and, for removing distortion or the like caused in the above manufacturing steps, the annular aluminum alloy sheets are stacked and subjected to pressure annealing in which the stacked sheets are annealed while applying pressure thereto from the opposite upper and lower sides to flatten the sheets, thereby producing an annular aluminum alloy disk blank.

The disk blank thus made is sequentially subjected to cutting, grinding, degreasing, etching, and zincate treatment (Zn substitution), as pretreatment. Then, electroless plating with Ni—P, which is a hard non-magnetic metal, is performed as undercoat treatment, and after the electroless plated front surface is made flat and smooth by polishing, it is coated with a magnetic substance by spattering. These processes manufacture an aluminum alloy magnetic disk.

In recent years, circumstances surrounding HDDs are drastically changing. HDDs have been mainly mounted on desktop PCs, but at present, due to appearance of terminals on which SSDs are mounted, such as notebook PCs, tablet PCs, and smart phones, needs for desktop PCs are declining. However, as the needs for the above-mentioned terminals increase, cloud services have developed, and accordingly setting-up of new data centers and expansion of existing data centers have been actively performed. In the data centers, HDDs are still mainly used and it is expected that the needs thereof will continue to increase.

It has become essential for HDDs used in the data centers to meet the requirements of larger capacity, higher density, and further, higher data transfer rate. To increase the capacity of an HDD, it is most effective to increase the number of magnetic disks mounted in the storage device, and to this end, it is essential to reduce the thickness of an aluminum alloy base material for a magnetic disk.

However, when the thickness of an aluminum alloy base material for a magnetic disk is simply reduced, the magnetic disks receive an increased exciting force due to an increase in fluid force caused by high-speed rotation, so that the problem of occurrence of disk flutter is caused. That is, high-speed rotation of the magnetic disks generates unstable airflows between them, causing vibration (fluttering) of magnetic disks. This phenomenon occurs because the low rigidity of an aluminum alloy base material results in large vibration of magnetic disk, so that a head, as a reading unit, cannot follow up changes due to the large vibration of the magnetic disks. Such disk flutter increases the frequency of errors in positioning of the head, and therefore there is a strong demand for reducing the disk flutter.

To increase the capacity of an HDD, it is also effective to increase the storage capacity per magnetic disk. In case the electroless Ni—P plated front surface have defectives, such as pits, and foreign deposits thereon, it is required to perform reading and writing by excluding such abnormal portions and their vicinity. Aa result, the storage capacity per magnetic disk is lowered in proportion to the number of abnormal portions. Thus, to increase the storage capacity, it is essentially necessary to reduce abnormal portions on the electroless Ni—P plated front surface.

Under such circumstances, recently, there is a strong demand for aluminum alloy magnetic disk substrates having both properties of reduced disk flutter and reduced abnormal portions on the electroless Ni—P plated front surface. Reduction of disk flutter cannot be achieved by Al—Mg-based alloys conforming to, for example, JIS5086, which are conventionally used. Distribution of a large amount of compounds in an aluminum alloy is effective for reducing disk flutter, and therefore, it is necessary to apply alloy species which have not been studied hitherto.

However, it has been commonly known that as the amount of compounds in the aluminum alloy increases, the number of abnormal portions on the electroless Ni—P plated front surface increases, and therefore, for conventional aluminum alloy base materials, there has been taken a counter measure of reducing the contents of Fe and Si. To meet the requirements of having both the properties of reduced disk flutter and reduced abnormal potions on the electroless Ni—P plated front surface, it is necessary to solve the two problems which are contradictory to each other at the same time. Further, the reduced thickness causes a concern that impact resistance is lowered, and thereof, it is desirable that the magnetic disk has as high strength as possible.

For example, Patent Literature 1 discloses a composition of an aluminum alloy base material in which a large amount of Si is added so as to reduce disk flutter. Further, Patent Literature 2 discloses a technique of preventing plating defects by adding sulfuric acid to washing water during the step of electroless Ni—P plating.

However, the aluminum alloy substrate disclosed in Patent Literature 1 is difficult to grind due to addition of a large amount of Si, and it is also difficult to remove Si on the surface of the aluminum alloy substrate, so that it has been impossible to solve the problem of increased abnormal portions on the electroless Ni—P plated front surface. Further, the technique of Patent Literature 2 achieves the effect on an aluminum alloy substrate which contains a small amount of compounds, and therefore, if it is impossible to expect the effect from an aluminum alloy substrate in which compounds are dispersed so as to reduce disk flutter.

CITATION LIST

Patent Literature

Patent Literature 1: International Publication No. WO 2016/068293

Patent Literature 2: Japanese Patent No. 5872322

SUMMARY OF INVENTION

Technical Problem

The present disclosure has been made in an effort to solve the above-described problems, and it is an object to provide an aluminum alloy base disk for a magnetic disk, which is small in disk flutter and reduced in abnormal portions on electroless Ni—P plated front surface thereof and a method for manufacturing the same, an aluminum alloy substrate used for manufacturing the aluminum alloy base disk and a method for manufacturing the same, and a magnetic disk using the aluminum alloy base disk and a method for manufacturing the same.

Solution to Problem

The present inventors intensively studied a relationship between compounds in an aluminum alloy base material, and disk flutter and platability. As a result, it was found that by adding Fe to the composition of an aluminum alloy substrate, it is possible to reduce disk flutter. Further, it was found that compounds in an aluminum alloy substrate formed by adding Fe are densely distributed on the entire surface, so that cathode sites are dispersed to uniformly react, which makes it possible to reduce defects, such as pits formed on the electroless Ni—P plated front surface when the aluminum alloy substrate is subsequently formed into an aluminum alloy base disk. From these results, as the material, the original goal was achieved, but a new problem in the manufacturing process was brought about.

It became evident that the compounds densely distributed on the entire surface of the aluminum alloy substrate are harder than the parent phase, and therefore has influence of reducing the speed of griding. Further, it was found that at end faces (outer peripheral surface and inner peripheral surface) of the aluminum alloy substrate, convex portions (nodules) are formed due to compounds and holes by subsequent execution of electroless Ni—P plating, and these convex portions drop off the end faces to attach various surfaces of the aluminum alloy base disk to form abnormal portions thereon. Here, from the front and back surfaces of the aluminum alloy base disk, the nodules are removed by the step of grinding. However, the end faces of the aluminum alloy base disk are not subjected to treatment after electroless Ni—P plating, and therefore, the nodules formed at the end faces remain without being removed and adversely affect the subsequent steps.

To solve the new problem in manufacturing, the present inventors continued studying, and as a result, found that by providing a step of removing compounds before the step of grinding executed before the step of electroless Ni—P plating, both the problems can be solved. The present inventors completed a technique for solving the two contradictory challenges to disperse compounds so as to reduce disk flutter and yet to reduce defects on the electroless Ni—P plated front surface, and further solving the problem in manufacturing, to complete the present disclosure.

Namely, claim 1 of the present disclosure describes an aluminum alloy substrate for a magnetic disk, including an aluminum alloy containing 0.1 to 3.0 mass % of Fe, 0.005 to 1.000 mass % of Cu, and 0.005 to 1.000 mass % of Zn, with a balance of Al and inevitable impurities, wherein in an outer peripheral surface thereof, the number of holes having maximum diameters of 10 μm or more is 200/mm² or less.

Claim 2 of the present disclosure describes that, in claim 1, the aluminum alloy further contains one or more selected from a group comprising 0.1 to 3.0 mass % of Mn, 0.1 to 3.0 mass % of Si, 0.1 to 8.0 mass % of Ni, 0.01 to 1.00 mass % of Cr, and 0.01 to 1.00 mass % of Zr.

Claim 3 of the present disclosure describes that, in claim 1 or 2, the aluminum alloy further contains one or more selected from a group comprising Ti, B, and V, of which a total content is 0.005 to 0.500 mass %.

Claim 4 of the present disclosure describes an aluminum alloy base disk for a magnetic disk, including an electroless Ni—P plated layer on the aluminum alloy substrate for a magnetic disk, according to any one of claims 1 to 3, wherein in an outer peripheral surface thereof, the number of convex portions having maximum diameters of 4 to 10 μm is 300/mm² or less.

Claim 5 of the present disclosure describes a magnetic disk including a magnetic substance layer on a surface of the aluminum alloy base disk for a magnetic disk, according to claim 4.

A method for manufacturing an aluminum alloy substrate according to the present disclosure includes a method according to the first disclosure and a method according to the second disclosure. The method according to the first disclosure is a method in which a semi-continuous casting method (DC casting method) is employed for a method for casting an aluminum alloy, as defined in claims 6 to 8. The method according to the second disclosure is a method in which a continuous casting method (CC casting method) is employed for the method for casting an aluminum alloy, as defined in claims 9 to 11.

Claim 6 of the present disclosure describes a method for manufacturing the aluminum alloy substrate for a magnetic disk, according to any one of claims 1 to 3, including a semi-continuous casting step of semi-continuously casting an ingot, using the aluminum alloy, a hot rolling step of hot rolling the ingot, a cold rolling step of cold rolling the hot-rolled plate, a disk blank-stamping step of stamping the cold-rolled sheet into an annular disk blank, a pressure flattening and annealing step of pressure annealing the disk blank formed by stamping, an inner and outer diameter machining step of machining an inner peripheral surface and an outer peripheral surface of the pressure-annealed disk blank, a stress relief heat treatment step of applying stress relief heat to the disk blank subjected to inner and outer diameter machining, a compound removal step of removing compounds on a surface of the disk blank subjected to stress relief heat treatment, and a grinding step of grinding the disk blank subjected to compound removal, wherein the compound removal step includes immersing the disk blank in a mixed solution of $NHO_3$ and HF, which is a 10 to 60 mass % of a $NHO_3$ solution at 10 to 30° C. and contains 10 to 80 g/L of HF, for 5 to 60 seconds.

Claim 7 of the present disclosure describes a method for manufacturing the aluminum alloy substrate for a magnetic disk, according to any one of claims 1 to 3, including a semi-continuous casting step of semi-continuously casting an ingot, using the aluminum alloy, a hot rolling step of hot rolling the ingot, a cold rolling step of cold rolling the hot-rolled plate, a disk blank-stamping step of stamping the cold-rolled sheet into an annular disk blank, a pressure flattening and annealing step of pressure annealing the disk blank formed by stamping, inner and outer diameter machining step of machining an inner peripheral surface and an outer peripheral surface of the pressure-annealed disk blank, a pre-griding step of pre-grinding the disk blank subjected to inner and outer diameter machining, a stress relief heat treatment step of applying stress relief heat to the disk blank subjected to pre-grinding, a compound removal step of removing compounds on a surface of the disk blank subjected to stress relief heat treatment, and a grinding step of grinding the disk blank subjected to compound removal, wherein the compound removal step includes immersing the disk blank in a mixed solution of $NHO_3$ and HF, which is a 10 to 60 mass % of a $NHO_3$ solution at 10 to 30° C. and contains 10 to 80 g/L of HF, for 5 to 60 seconds.

Claim 8 of the present disclosure describes a method for manufacturing the aluminum alloy substrate for a magnetic disk, according to any one of claims 1 to 3, including a semi-continuous casting step of semi-continuously casting an ingot, using the aluminum alloy, a hot rolling step of hot rolling the ingot, a cold rolling step of cold rolling the hot-rolled plate, a disk blank-stamping step of stamping the cold-rolled sheet into an annular disk blank, a pressure flattening and annealing step of pressure annealing the disk blank formed by stamping, inner and outer diameter machining step of machining an inner peripheral surface and an outer peripheral surface of the pressure-annealed disk blank, a lathing step of lathing the disk blank subjected to inner and outer diameter machining, a stress relief heat treatment step of applying stress relief heat to the disk blank subjected to lathing, a compound removal step of removing compounds on a surface of the disk blank subjected to stress relief heat treatment, and a grinding step of grinding the disk blank subjected to compound removal, wherein the compound removal step includes immersing the disk blank in a mixed solution of $NHO_3$ and HF, which is a 10 to 60 mass % of a $NHO_3$ solution at 10 to 30° C. and contains 10 to 80 g/L of HF, for 5 to 60 seconds.

Claim 9 of the present disclosure describes a method for manufacturing the aluminum alloy substrate for a magnetic disk, according to any one of claims 1 to 3, including a continuous casting step of continuously casting an ingot, using the aluminum alloy, a cold rolling step of cold rolling the ingot, a disk blank-stamping step of stamping the cold-rolled sheet into an annular disk blank, a pressure flattening and annealing step of pressure annealing the disk blank formed by stamping, inner and outer diameter machining step of machining an inner peripheral surface and an outer peripheral surface of the pressure-annealed disk blank, a stress relief heat treatment step of applying stress relief heat to the disk blank subjected to inner and outer diameter machining, a compound removal step of removing compounds on a surface of the disk blank subjected to stress relief heat treatment, and a grinding step of grinding the disk blank subjected to compound removal, wherein the compound removal step includes immersing the disk blank in a mixed solution of $NHO_3$ and HF, which is a 10 to 60 mass % of a $NHO_3$ solution at 10 to 30° C. and contains 10 to 80 g/L of HF, for 5 to 60 seconds.

Claim 10 of the present disclosure describes a method for manufacturing the aluminum alloy substrate for a magnetic disk, according to any one of claims 1 to 3, including a continuous casting step of continuously casting an ingot, using the aluminum alloy, a cold rolling step of cold rolling the ingot, a disk blank-stamping step of stamping the cold-rolled sheet into an annular disk blank, a pressure flattening and annealing step of pressure annealing the disk blank formed by stamping, inner and outer diameter machining step of machining an inner peripheral surface and an outer peripheral surface of the pressure-annealed disk blank, a pre-grinding step of pre-grinding the disk blank subjected to inner and outer diameter machining, a stress relief heat treatment step of applying stress relief heat to the disk blank subjected to pre-grinding, a compound removal step of removing compounds on a surface of the disk blank subjected to stress relief heat treatment, and a grinding step of grinding the disk blank subjected to compound removal, wherein the compound removal step includes immersing the disk blank in a mixed solution of $NHO_3$ and HF, which is a 10 to 60 mass % of a $NHO_3$ solution at 10 to 30° C. and contains 10 to 80 g/L of HF, for 5 to 60 seconds.

Claim 11 of the present disclosure describes a method for manufacturing the aluminum alloy substrate for a magnetic disk, according to any one of claims 1 to 3, including a continuous casting step of continuously casting an ingot, using the aluminum alloy, a cold rolling step of cold rolling the ingot, a disk blank-stamping step of stamping the cold-rolled sheet into an annular disk blank, a pressure flattening and annealing step of pressure annealing the disk blank formed by stamping, inner and outer diameter machining step of machining an inner peripheral surface and an outer peripheral surface of the pressure-annealed disk blank, a lathing step of lathing the disk blank subjected to inner and outer diameter machining, a stress relief heat treatment step of applying stress relief heat to the disk blank subjected to lathing, a compound removal step of removing compounds on a surface of the disk blank subjected to stress relief heat treatment, and a grinding step of grinding the disk blank subjected to compound removal, wherein the compound removal step includes immersing the disk blank in a mixed solution of $NHO_3$ and HF, which is a 10 to 60 mass % of a $NHO_3$ solution at 10 to 30° C. and contains 10 to 80 g/L of HF, for 5 to 60 seconds.

Claim 12 of the present disclosure describes a method for manufacturing the aluminum alloy base disk for a magnetic disk, according to claim 4, including, after the grinding step in the method for manufacturing an aluminum alloy substrate, according to any one of claims 6 to 8 and 9 to 11, a plating pretreatment step including an alkaline degreasing treatment stage, an acid etching treatment stage, a desmutting treatment stage, and a zincate treatment stage, for the disk blank, in the mentioned order, and an electroless Ni—P plating treatment step of performing electroless Ni—P plating treatment on a surface of the disk blank subjected to the plating pretreatment step.

Claim 13 of the present disclosure describes a method for manufacturing the magnetic disk according to claim 5, including polishing a surface of the aluminum alloy base disk for a magnetic disk, according to claim 4, and causing a magnetic substance to be applied on the polished surface by spattering.

Advantageous Effects of Invention

The aluminum alloy base disk for a magnetic disk, according to the present disclosure, has a characteristic feature that disk flutter is reduced and also abnormal portions on the electroless Ni—P plated front surface are reduced. This makes it possible to increase the number of mounted magnetic disks by reducing the thickness thereof and increase storage capacity per magnetic disk, thereby being capable of providing magnetic disks contributing to an increased capacity of an HDD.

DESCRIPTION OF EMBODIMENTS

Figure 1:
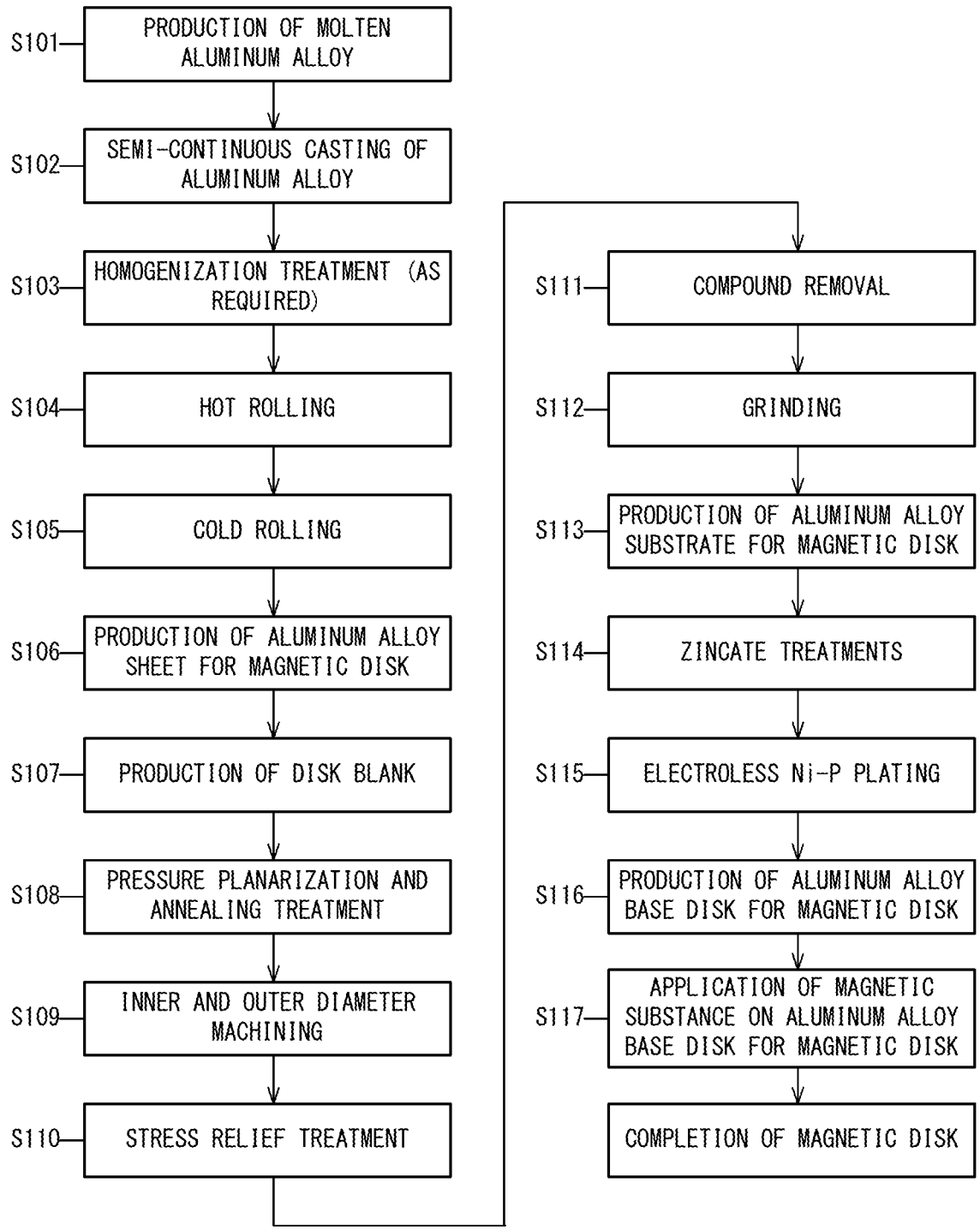
FIG. 1 is a flow diagram showing a method for manufacturing an aluminum alloy substrate for a magnetic disk, an aluminum alloy base disk for a magnetic disk, and a magnetic disk, according to the present disclosure, wherein a DC casting method is employed for a method for casting an aluminum alloy.

The present disclosure will be described in detail hereinafter based on embodiments. The present disclosure is characterized in that before a grinding step executed before an electroless Ni—P plating step, a compound removal step is provided, whereby it is made possible to improve the grindability of an aluminum alloy substrate for a magnetic disk, in which compounds are dispersed by addition of Fe for the purpose of reducing disk flutter, and suppress generation of nodules on an outer peripheral surface and an inner peripheral surface of an aluminum alloy base disk, which are caused by Ni—P plating when the aluminum alloy substrate is subsequently formed into the aluminum alloy base disk. The advantageous effects and details of the mechanism of these will be described hereafter.

1. Working of Disk Blank

After a disk blank is subjected to inner and outer diameter machining and surface machining, the disk blank is subjected to a plating pretreatment step (including an alkaline degreasing treatment stage, an acid etching treatment stage, a desmutting treatment stage, and a zincate treatment stage, in the mentioned order) and then to electroless Ni—P plating. The inner and outer diameter machining is a step in which end faces of the disk blank, more specifically, an outer peripheral surface defining an outer diameter and an inner peripheral surface defining an inner diameter are worked into respective predetermined shapes. The surface machining after the inner and outer diameter machining includes a variety of patterns, such as "grinding step only", "pre-grinding step and subsequent grinding step", and "lathing step and subsequent grinding step" With each of these patterns of the surface machining, it is possible to obtain an aluminum alloy substrate for a magnetic disk, which is adjusted in thickness, improved in flatness, adjusted in roughness, reduced in waviness, and improved in like other respects. Further, before lathing, a stress relief heat treatment step and a compound removal step subsequent to the stress relief heat treatment step, which do not belong to the surface machining, are provided. Through the above-described steps, the aluminum alloy substrate for a magnetic disk (hereafter, sometimes simply referred to as the "aluminum alloy substrate") is obtained.

2. Plating Pretreatment

Next, the aluminum alloy substrate for a magnetic disk is subjected to the plating pretreatment step including the alkaline degreasing treatment stage, the acid etching treatment stage, the desmutting treatment stage, and the zincate treatment stage, in the mentioned order. In the zincate treatment stage, 1st zincate treatment, Zn peeling treatment, and 2nd zincate treatment are executed in the mentioned order. Note that in a case where the alkaline degreasing treatment stage and the acid etching treatment stage are simultaneously executed, the desmutting treatment stage is sometimes not executed.

3. Electroless Ni—P Plating

The aluminum alloy substrate for a magnetic disk, which has been subjected to the plating pretreatment step, is subjected to the electroless Ni—P plating treatment to form an aluminum alloy base disk for a magnetic disk (hereafter sometimes simply referred to as the "aluminum alloy base disk"). On a front surface, a back surface, an inner peripheral surface, and an outer peripheral surface of the aluminum alloy base disk for a magnetic disk obtained by performing the electroless Ni—P plating treatment, nodules each having a circular convex shape exist in a scattered state.

4. Influence of Nodules After Electroless Ni—P Plating Step 4-1. Surfaces of Aluminum Alloy Base Disk for Magnetic Disk From the front and back surfaces of the aluminum alloy base disk subjected to the Ni—P plating step, nodules are removed by the grinding step subsequent thereto. Therefore, there is no problem of existence of nodules on the front and back surfaces.

4-2. Inner and Outer Peripheral Surfaces of Aluminum Alloy Base Disk for Magnetic Disk As described hereinbefore, nodules are generated also on the inner and outer peripheral surfaces, which are opposite end faces of the aluminum alloy base disk subjected to electroless Ni—P plating. After electroless Ni—P plating, no further treatment is performed on the inner and outer peripheral surfaces. Therefore, generated nodules remain as they are in the products of magnetic disks. After the electroless Ni—P plating step, there are executed the grinding step, a spattering step, and the like, and particularly in the spattering step, treatment is sometimes performed by supporting the outer peripheral surface of the aluminum alloy base disk for a magnetic disk, using a jig. In doing this, if nodules having convex shapes are rubbed against the jig, worn powder is sometimes produced and applied on the surfaces (front, back, inner peripheral, and outer peripheral surfaces) of the aluminum alloy substrate base disk. Application of such worn powder brings about a problem of a magnetic film formed by spattering being made non-uniform. Therefore, it is essentially required to reduce nodules on the outer peripheral surface of the aluminum alloy base disk to the minimum.

Specifically, the above-mentioned problem is not brought about if the number of convex portions (nodules) having a maximum diameter of 4 to 10 μm is 300/mm$^2$ or less, preferably 150/mm$^2$ or less. Note that as the density is smaller, it is more preferable, but its lower limit value is naturally determined by the composition of aluminum alloy used and a manufacturing method, and in the present disclosure, approximately 30/mm$^2$ is the lower limit. Convex portions having a maximum diameter of less than 4 μm are hardly changed into the above-mentioned worn powder, and therefore, no problem is brought about even if they exist. On the other hand, convex portions having a maximum diameter of more than 10 μm are not produced by electroless Ni—P plating, and therefore, no problem is brought about. For these reasons, the maximum diameter of convex portions on the outer peripheral surface is limited to 4 to 10

5. Generation of Nodules

The above-mentioned nodules are ascribable to non-uniformity of the surfaces of the aluminum alloy substrate which are subjected to electroless Ni—P plating. The nodules are liable to be generated mainly on portions other than the uniform surface, such as compounds, ends of holes, and convex portions of the surfaces. In the electroless Ni—P plating, Ni—P randomly precipitates on the entire surfaces and portions forming islands are united to each other to grow into a uniform film. However, if there are portions where precipitation of Ni—P in Ni—P plating occurs at a slightly different timing than it occurs on the surfaces, the portions alone remain as convex portions to form nodules. As described hereinafter, a large amount of compounds exists in the aluminum alloy substrate according to the present disclosure, and therefore, in the surfaces of the aluminum alloy base disk after the electroless Ni—P plating step, there are a very large number of nodules ascribable to compounds and holes.

Non-uniformity of ends of holes is one cause of generation of modules on the surfaces of the aluminum alloy base disk, as described above, but such holes are formed in large number by the compound-removing step for the aluminum alloy substrate. Therefore, it is important to suppress generation of nodules ascribable to holes formed in the compound removal step. Specifically, the number of holes having a maximum diameter of 10 μm or more on the outer peripheral surface of the aluminum alloy substrate is set to 200/mm$^2$ or less, preferably to 100/mm$^2$ or less, whereby it is possible to suppress generation of nodules on the surfaces of the aluminum alloy base disk found after the electroless Ni—P plating step. Note that as the density is lower, it is more preferable, but its lower limit value is naturally determined by the composition of aluminum alloy used and a manufacturing method, and in the present disclosure, approximately 30/mm$^2$ is the lower limit. Note that holes having a maximum diameter of less than 10 μm are buried by electroless Ni—P plating, thereby making the front surface flat and smooth, and therefore, even if such holes are formed, they do not bring about the problem of generation of nodules. Further, the upper limit of the maximum diameter of holes is naturally determined by the composition of aluminum alloy used and a manufacturing method, and in the present disclosure, approximately 20 μm is the upper limit.

6. Alloy Composition of Aluminum Alloy Substrate for Magnetic Disk

An aluminum alloy used for an aluminum alloy substrate for a magnetic disk, according to the present disclosure, has a composition containing 0.1 to 3.0 mass % (hereafter simply denoted as "%") of Fe, 0.005 to 1.000% of Cu, and 0.005 to 1.000% of Zn, as essential elements, with a balance of Al and inevitable impurities. The composition may further contain one or more selected from 0.1 to 3.0% of Mn, 0.1 to 3.0% of Si, 0.1 to 8.0% of Ni, 0.01 to 1.00% of Cr, and 0.01 to 1.00% of Zr, as first selective elements. In addition, the composition may further contain one or more selected from Ti, B, and V at a total content of 0.005% to 0.500%, as second selective elements. Hereafter, the content and operation of each alloy component will be described.

Fe: 0.1 to 3.0%

Fe exists principally in the form of second phase particles (Al—Fe-based compounds and the like) partly in a state solid-dissolved in a parent phase and has the effect of improving the strength and fluttering characteristic of an aluminum alloy substrate. When vibrations are applied to a magnetic disk using such an aluminum alloy substrate, vibrational energy is immediately absorbed due to viscous flow in the interface between the second phase particles and the parent phase, whereby a very high fluttering characteristic is obtained.

An Fe content of less than 0.10% does not give sufficient strength and fluttering characteristic to the magnetic disk using the aluminum alloy substrate. On the other hand, an Fe content of more than 3.00% causes generation of a large number of coarse Al—Fe-based compounds. Even the Al—Fe-based compounds can be removed by the compound removal step, but concave portions formed by removal thereof are large, so that the outer peripheral surface subjected to electroless Ni—P plating has a large number of nodules formed thereon. Accordingly, the content of Fe in the aluminum alloy is set in a range of 0.1 to 3.0%. The content of Fe is preferably in a range of 0.5 to 1.5%.

Cu: 0.005 to 1.000%

Cu exists principally in the form of second phase particles (Al—Cu-based compounds and the like) and has the effect of improving the strength and fluttering characteristic of the magnetic disk using the aluminum alloy substrate. Further, Cu also causes a zincate film to be uniformly, thinly, and closely generated, and has the effect of improving the smoothness of the electroless Ni—P plating.

A Cu content of less than 0.005% makes the magnetic disk using the aluminum alloy substrate insufficient in strength and fluttering characteristic thereof, and also causes the zincate film to be non-uniform and lower the smoothness of the Ni—P plating. On the other hand, a Cu content of more than 1.000% causes generation of a large number of coarse Al—Cu-based compounds. Even the coarse Al—Cu-based compounds can be removed by the compound removal step, but concave portions formed by removal thereof are large, so that the outer peripheral surface subjected to electroless Ni—P plating has a large number of nodules formed thereon. Accordingly, the content of Cu is set in a range of 0.005 to 1.000%. The content of Cu is preferably in a range of 0.005 to 0.400%.

Zn: 0.005 to 1.000%

Zn causes a zincate film to be uniformly, thinly, and closely generated and has the effect of improving the smoothness and adhesion of the electroless Ni—P plating. Further, Zn forms second phase particles in combination with other additional elements, and has the effect of improving the fluttering disk of the magnetic disk using the aluminum alloy substrate.

A Zn content of less than 0.005% causes the zincate film to be non-uniform and thereby lower the smoothness of the electroless Ni—P plating. On the other hand, a Zn content of more than 1.000% causes the potential of the parent phase to be too electronegative so that the dissolution rate of the parent phase in the compound removal step and the Ni—P plating step becomes high. As a result, the surfaces of the aluminum alloy substrate have large concave and convex portions so that the smoothness of the electroless Ni—P plated front surface is lowered. Accordingly, the content of Zn is set in a range of 0.005 to 1.000%. The content of Zn is preferably in a range of 0.100 to 0.700%.

Mn: 0.1 to 3.0%

Mn exists principally as second phase particles (Al—Mn-based compounds) and has the effect of improving the strength and fluttering characteristic of the magnetic disk using the aluminum alloy substrate. When vibrations are applied to the magnetic disk using the aluminum alloy substrate, vibrational energy is immediately absorbed due to viscous flow in the interface between the second phase particles and the parent phase, whereby a very high fluttering characteristic is obtained.

A Mn content of less than 0.1% makes the magnetic disk using the aluminum alloy substrate insufficient in strength and fluttering characteristic thereof. On the other hand, a Mn content of more than 3.0% suppresses generation of a large number of coarse Al—Mn-based compounds. Even the coarse Al—Mn-based compounds can be removed by the compound removal step, but concave portions formed by removal thereof are large, so that the outer peripheral surface subjected to electroless Ni—P plating has a large number of nodules formed thereon. Accordingly, the content of Mn is set in a range of 0.1 to 3.0%. The content of Mn is more preferably in a range of 0.1 to 1.0%.

Si: 0.1 to 3.0%

Si exists principally as second phase particles (Si particles and the like) and has the effect of improving the strength and fluttering characteristic of the magnetic disk using the aluminum alloy substrate. When vibrations are applied to the magnetic disk using the aluminum alloy substrate, vibrational energy is immediately absorbed due to viscous flow in the interface between the second phase particles and the parent phase, whereby a very high fluttering characteristic is obtained.

A Si content of less than 0.1% makes the magnetic disk using the aluminum alloy substrate insufficient in strength and fluttering characteristic thereof. On the other hand, a Si content of more than 3.00% causes generation of a large number of coarse Si particles. The coarse Si particles are difficult to be removed by the compound removal step and therefore remain in the surfaces of the aluminum alloy substrate, causing lowering of the smoothness of the electroless Ni—P plated front surface and plating peeling. Accordingly, the content of Si is set in a range of 0.1 to 3.0%. The content of Si is preferably set in a range of 0.3 to 1.5%.

Ni: 0.1 to 8.0%

Ni exists principally as second phase particles (Al—Ni-based compounds and the like) and has the effect of improving the strength and fluttering characteristic of the magnetic disk using the aluminum alloy substrate. When vibrations are applied to the magnetic disk using the aluminum alloy substrate, vibrational energy is immediately absorbed due to viscous flow in the interface between the second phase particles and the matrix, whereby a very high fluttering characteristic is obtained.

A Ni content of less than 0.1% in the aluminum alloy makes the magnetic disk using the aluminum alloy substrate insufficient in strength and fluttering characteristic thereof. On the other hand, a Ni content of more than 8.0% causes generation of a large number of coarse Al—Ni-based compounds. Even the coarse Al—Ni-based compounds can be removed by the compound removal step, but concave portions formed by removal thereof are large, so that the outer peripheral surface subjected to electroless Ni—P plating has a large number of nodules formed thereon. Accordingly, the content of Ni is set in a range of 0.1 to 8.0%. The content of Ni is preferably in a range of 0.3 to 3.0%, more preferably in a range of 0.5 to 2.0%.

Cr: 0.01 to 1.00%

Cr exists principally as second phase particles (Al—Cr-based compounds and the like) and has the effect of improving the strength and fluttering characteristic of the magnetic disk using the aluminum alloy substrate. A Cr content of less than 0.01% makes the magnetic disk using the aluminum alloy substrate insufficient in strength and fluttering characteristic thereof. On the other hand, a Cr content of more than 1.00% causes generation of a large number of coarse Al—Cr-based compounds. Even the coarse Al—Cr-based compounds can be removed by the compound removal step, but concave portions formed by removal thereof are large, so that the outer peripheral surface subjected to electroless Ni—P plating has a large number of nodules formed thereon.

Accordingly, the content of Cr is set in a range of 0.01 to 1.00%. The content of Cr is preferably set in a range of 0.10 to 0.50%, more preferably in a range of 0.15 to 0.40%.

Zr: 0.01 to 1.00%

Zr exists principally as second phase particles (Al—Zr-based compounds and the like) and has the effect of improving the strength and fluttering characteristic of the magnetic disk using the aluminum alloy substrate. A Zr content of less than 0.01% makes the magnetic disk using the aluminum alloy substrate insufficient in strength and fluttering characteristic thereof. On the other hand, a Zr content of more than 1.00% causes generation of a large number of coarse Al—Zr-based compounds. Even the coarse Al—Zr-based compounds can be removed by the compound removal step, but concave portions formed by removal thereof are large, so that the outer peripheral surface subjected to electroless Ni—P plating has a large number of nodules formed thereon. Accordingly, the content of Zr is set in a range of 0.01 to 1.00%, preferably in a range of 0.10 to 0.50%.

Ti, B, V: 0.005 to 0.500%

Ti, B, V form, in a solidification process in casting, second phase particles (particles of borides, such as $TiB_2$, $Al_3Ti$, Ti—V—B, and the like), which become crystal grain nuclei, and therefore it is possible to make crystal grains finer. Finer crystal grains reduce the non-uniformity of the sizes of the second phase particles and variation in the strength and fluttering characteristic of the magnetic disk using the aluminum alloy substrate. However, it is impossible to obtain the above-mentioned effects when the total of the contents of Ti, B, and V is less than 0.005%. On the other hand, when the total of the contents of Ti, B, and V is more than 0.500% as well, the above effects are saturated and therefore, it is impossible to obtain more noticeable improvement effects than the above. Accordingly, the total of the contents of Ti, B, and V is set in a range of 0.005 to 0.500%. The total of the contents of Ti, B, and V is preferably set in a range of 0.005 to 0.100%. Note that the total of the contents of Ti, B, and V refers to the total of three elements when all the three elements are contained, to the total of two elements when only the two elements are contained, and to the total of one element when only one element is contained.

Other Elements

The balance of the aluminum alloy base material for use in the aluminum alloy substrate according to the present disclosure comprises Al and inevitable impurities. Here, as the inevitable impurities, there may be mentioned Mg, Pb, Ga, Sn, and so forth, and the characteristics of the aluminum alloy substrate obtained in the present disclosure are not spoiled so long as each content is less than 0.10% and also the total content is less than 0.20%.

7. Compound Removal Step

The aluminum alloy substrate reduced in disk fluttering, according to the present disclosure, contains Fe, so that compounds are large and also the distribution density thereof is high. Therefore, the aluminum alloy base disk subjected to electroless Ni—P plating has a large number of nodules formed thereon. However, as described hereinbefore, the nodules on the front and back surfaces of the aluminum alloy base disk are removed therefrom by the grinding step, and therefore, these modules do not bring about any problem. On the other hand, nodules formed on the inner and outer peripheral surfaces of the aluminum alloy base disk remain as they are. Therefore, by applying the compound removal step to the aluminum alloy substrate, the nodules on the front and back surfaces of the aluminum alloy base disk are removed in advance, whereby it is possible to prevent nodules from being generated on the inner and outer peripheral surfaces of the aluminum alloy base disk subjected to the electroless Ni—Pl plating step. The compounds, mentioned in the present disclosure, are intermetallic compounds, such as AL-Fe and Al—Fe—Mn.

In the compound removal step, compounds remaining on the surfaces of the aluminum alloy substrate are removed by a chemical liquid. As the chemical liquid, there is used a mixed solution of $HNO_3$ and HF, which is a solution of 10 to 60 mass % (hereinafter simply denoted as "%") of $HNO_3$ at 10 to 30° C., which contains 10 to 80 g/L of HF. This mixed solution has a strong etching power and increases a dissolving rate of compounds and their surroundings of the aluminum alloy substrate. Through dissolution of compounds and their surroundings of the aluminum alloy substrate, the compounds are removed, so that it is possible to selectively remove only compounds on the surfaces of the aluminum alloy substrate.

In the above-described mixed solution, in a case where the concentration of HF is less than 10 g/L and the concentration of $HNO_3$ is less than 10%, etching power is weak so that it is impossible to sufficiently remove compounds on the surfaces of the aluminum alloy substrate. On the other hand, in a case where the concentration of HF is more than 80 g/L and the concentration of $HNO_3$ is more than 60%, etching power is too strong and the dissolution of the parent phase of the aluminum alloy substrate proceeds. As a result, concave and convex portions on the surfaces of the aluminum alloy substrate become large and it is impossible to achieve smoothness of the electroless Ni—P plated front surface formed by the electroless Ni—P plating step subsequent thereto. The concentration of HF is preferably 20 to 60 g/L and the concentration of $HNO_3$ is preferably 25 to 50%.

The temperature of the mixed solution is set to 10 to 30° C. If the temperature is lower than 10° C., the reaction rate is low so that it is impossible to sufficiently remove compounds on the surfaces of the aluminum alloy substrate. On the other hand, if the temperature is higher than 30° C., the reaction rate is too high so that the dissolution of the parent phase of the aluminum alloy substrate proceeds, resulting in larger concave and convex portions on the surfaces of the aluminum alloy substrate. The temperature of the mixed solution is preferably 15 to 25° C. Further, the treatment time in the compound removal step is 5 to 60 seconds. If the treatment time is less than 5 seconds, the reaction time is too short so that it is impossible to sufficiently remove compounds on the surfaces of the aluminum alloy substrate. On the other hand, if the treatment time is more than 60 seconds, the reaction time is too long so that the dissolution of the parent phase of the aluminum alloy substrate proceeds, resulting in larger concave and convex portions on the surfaces of the aluminum alloy substrate. The treatment time is preferably 10 to 30 seconds.

The compound removal step is executed before the grinding step for the aluminum alloy substrate. More specifically, there is employed an order of "inner and outer diameter machining step—stress relief heat treatment step—compound removal step—grinding step", or an order of "inner and outer diameter machining step—pre-griding step—stress relief heat treatment step—compound removal step— grinding step" or an order of "inner and outer diameter machining step—lathing step—stress relief heat treatment step—compound removal step—grinding step".

8. Method for Manufacturing Aluminum Alloy Substrate for Magnetic Disk According to First Disclosure

8.1 Outline

With reference to FIG. 1, the method for manufacturing the aluminum alloy substrate for a magnetic disk according to the first disclosure will be described. The aluminum alloy substrate according to the disclosure is manufactured by first production a molten alloy such that the alloy has a predetermined alloy composition (S101), semi-continuously rolling the molten alloy (S102), subjecting an ingot to desired homogenization treatment (S103), executing hot rolling (S104) and cold rolling (S105), to manufacture an aluminum alloy sheet (S106). Note that before or during cold rolling, the rolled plate may be subjected to annealing treatment.

Figure 2:
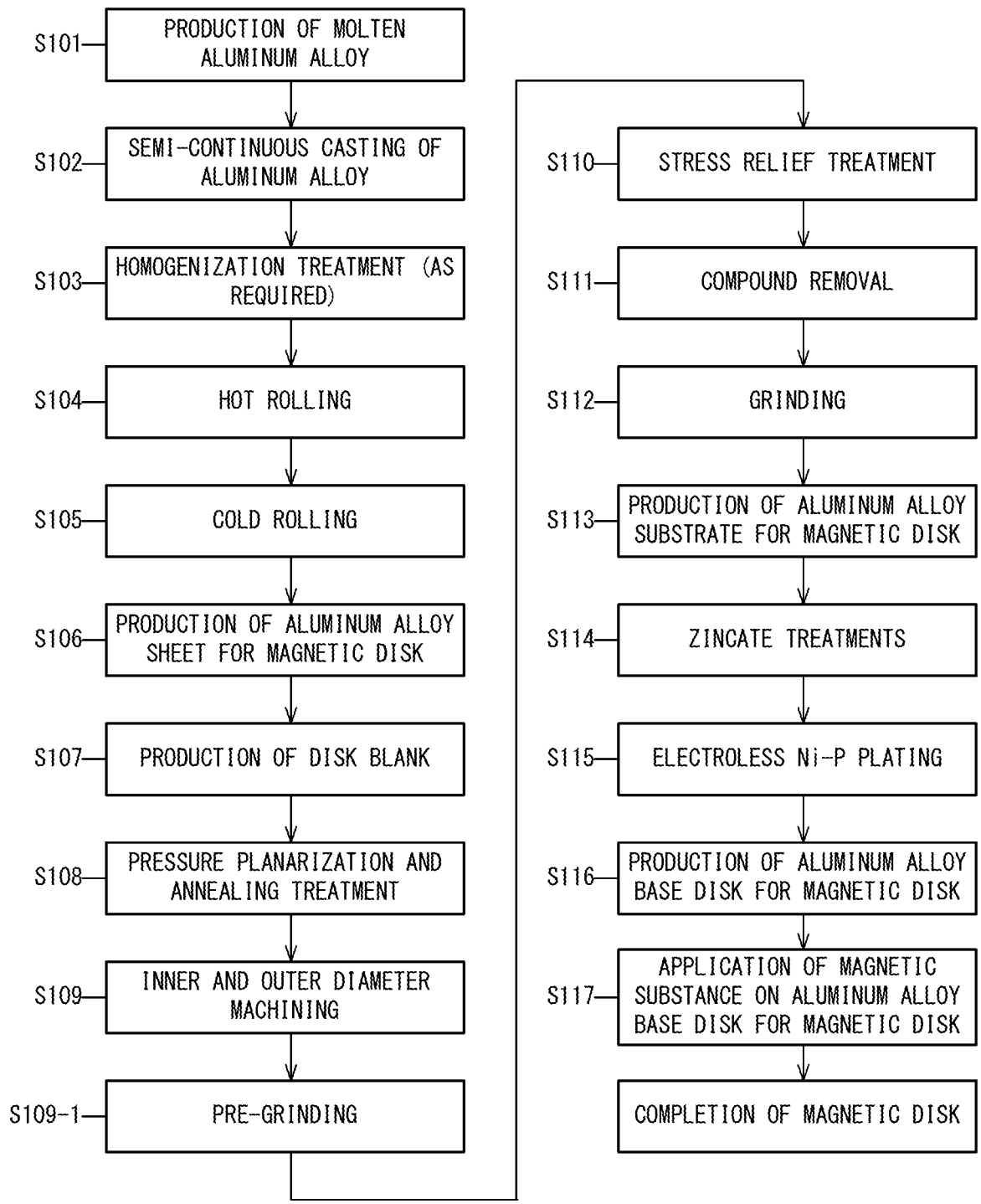
FIG. 2 is a flow diagram showing another method for manufacturing an aluminum alloy substrate for a magnetic disk, an aluminum alloy base disk for a magnetic disk, and a magnetic disk, according to the present disclosure, wherein the DC casting method is employed for the method for casting an aluminum alloy.
Figure 3:
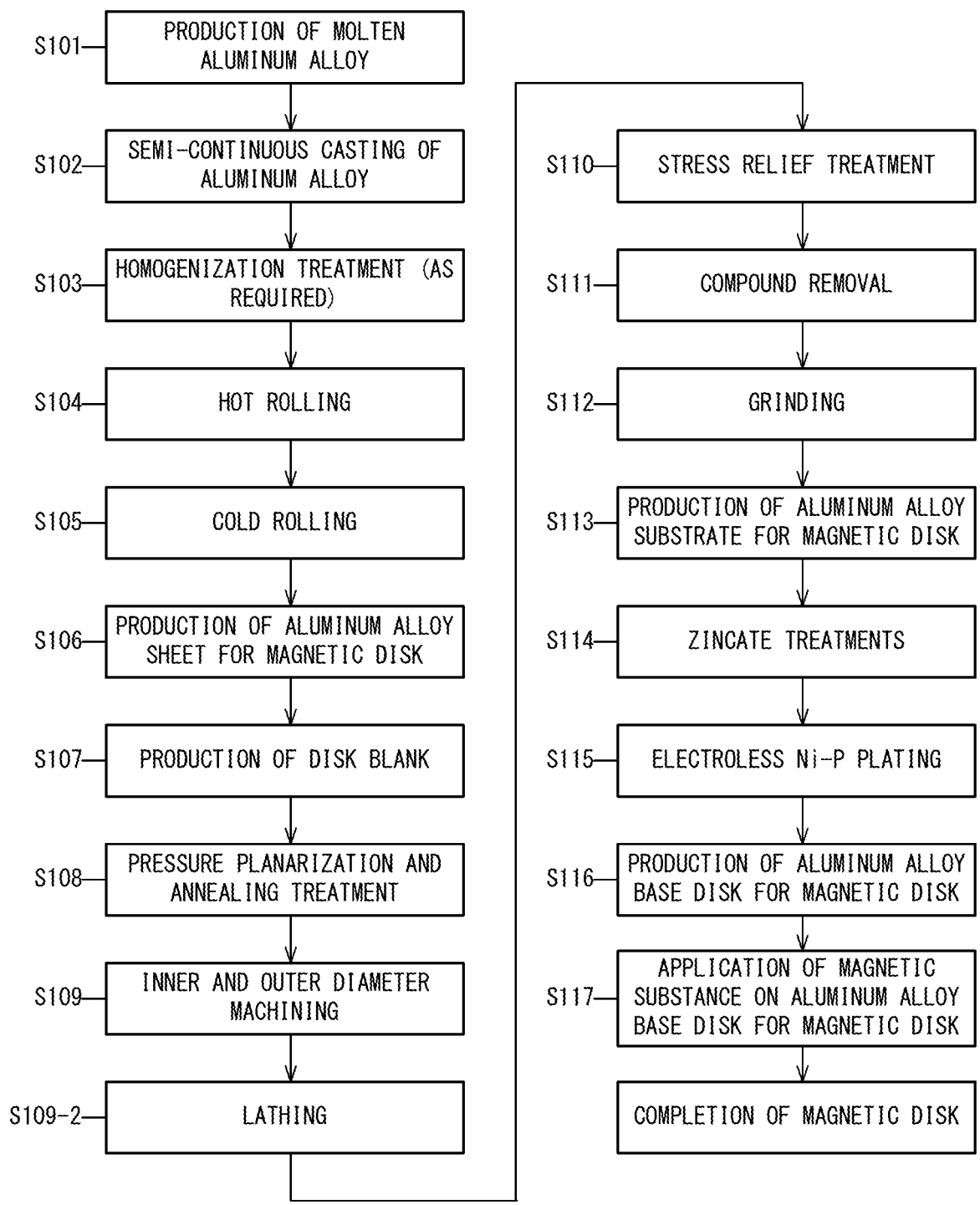
FIG. 3 is a flow diagram showing still another method for manufacturing an aluminum alloy substrate for a magnetic disk, an aluminum alloy base disk for a magnetic disk, and a magnetic disk, according to the present disclosure, wherein the DC casting method is employed for the method for casting an aluminum alloy.

The aluminum alloy sheet thus made is stamped into an annular shape to form an annular disk blank (S107), and this disk blank is subjected to pressure planarization and annealing treatment (S108). Further, the inner and outer peripheral surfaces of the disk blank are subjected to inner and outer diameter machining (S109), and the disk blank is subjected to stress relief heat treatment (S110), compound removal (S111) and grinding (S112). Instead of the steps of S109 to S112, as shown in FIG. 2, after the inner and outer peripheral surfaces of the disk blank are subjected to inner and outer diameter machining (S109), the disk blank may be subjected to pre-grinding (S109-1), stress relief heat treatment (S110), compound removal (S111) and grinding (S112). Further alternatively, as shown in FIG. 3, after the inner and outer peripheral surfaces of the disk blank are subjected to inner and outer diameter machining (S109), the disk blank may be subjected to lathing (S109-2), stress relief heat treatment (S110), compound removal (S111) and grinding (S112). Thus, the disk blank is formed into the aluminum alloy substrate for a magnetic disk (S113). Hereafter, the steps are described in detail.

8-2. Casting Step

First, a molten aluminum alloy is prepared according to a usual method by heating and dissolution such that the aluminum alloy has a predetermined composition range. The thus prepared molten aluminum alloy is cast by a semi-continuous casting method (DC casting method). The cooling rate during casting is preferably in a range of 0.1 to 1000° C./s.

8-3. Homogenization Treatment Step

Next, the cast aluminum alloy ingot is subjected to homogenization treatment as required. The conditions of homogenization treatment are not particularly limited. For example, one-step heat treatment at 500° C. or higher for 0.5 hours or more may be executed. The upper limit of heating temperature during homogenization treatment is not particularly limited, but if the heating temperature is higher than 650° C., there is a fear of occurrence of dissolution of the aluminum alloy, and therefore the upper limit thereof is set to 650° C.

8-4. Hot Rolling Step

The ingot of the aluminum alloy subjected to homogenization treatment or not subjected to homogenization treatment is hot-rolled into a plate. In the hot rolling step, in a case where homogenization treatment has been conducted, a hot rolling start temperature is preferably set to 300 to 550° C. and a hot rolling end temperature is preferably set to lower than 380° C., more preferably to lower than 300° C. The lower limit of the hot rolling end temperature is not particularly limited, but to prevent occurrence of defects, such as edge cracks, the lower limit is set to 200° C. On the other hand, in a case where homogenization treatment has not been conducted, the hot rolling start temperature is preferably set to than 380° C. or lower, more preferably to 350° C. or lower. The lower limit of the hot rolling end temperature is not particularly limited, but to prevent occurrence of defects, such as edge cracks, the lower limit is set to 200° C.

8-5. Cold Rolling Step

Next, the hot-rolled plate is cold-rolled into a cold-rolled sheet having a thickness of 0.45 to 1.8 mm. Thus, the hot-rolled plate is cold-rolled to a required product thickness. The conditions of cold rolling are not particularly limited, but they are only required to be determined according to a required product sheet strength and thickness, and a cold-rolling ratio is preferably set to 10 to 95%. Before or during cold rolling, there may be provided an annealing step for ensuring cold rolling workability. In a case where annealing is executed, for batch-type annealing, for example, the conditions are a temperature of 200° C. or higher and 380° C. or lower and a treatment time of 0.1 to 10 hours.

8-6. Disk Blank-Stamping Step and Pressure Planarization and Annealing Treatment Step The aluminum alloy sheet made as described above is stamped into an annular shape to prepare an annular aluminum alloy sheet. Then, pressure planarization and annealing treatment is conducted on the annular aluminum alloy sheet at 220 to 450° C. for 30 minutes or more, to prepare a flattened annular disk blank.

8-7. Machining Step, Stress relief Heat Treatment, and Compound Removal Step Next, the flattened disk blank is subjected, as shown in FIG. 1, to inner and outer diameter machining (S109), stress relief heat treatment (S110), compound removal (S111), and grinding (S112), or as shown in FIG. 2, the pre-grinding step (S109-1) is provided between the steps 109 and S110 appearing in FIG. 1, or alternatively, as shown in FIG. 3, the lathing (S109-2) is provided between t between the steps 109 and S110 appearing in FIG. 1. Here, in the stress relief heat treatment step, the aluminum alloy sheet is subjected to heat treatment preferably at a temperature of 250 to 400° C. for 5 to 15 minutes. Further, the compound removal (S111) is executed as described hereinabove. Thus, the aluminum alloy substrate is obtained.

9. Method for Manufacturing Aluminum Alloy Substrate for Magnetic Disk According to Second Disclosure

9.1 Outline

Figure 4:
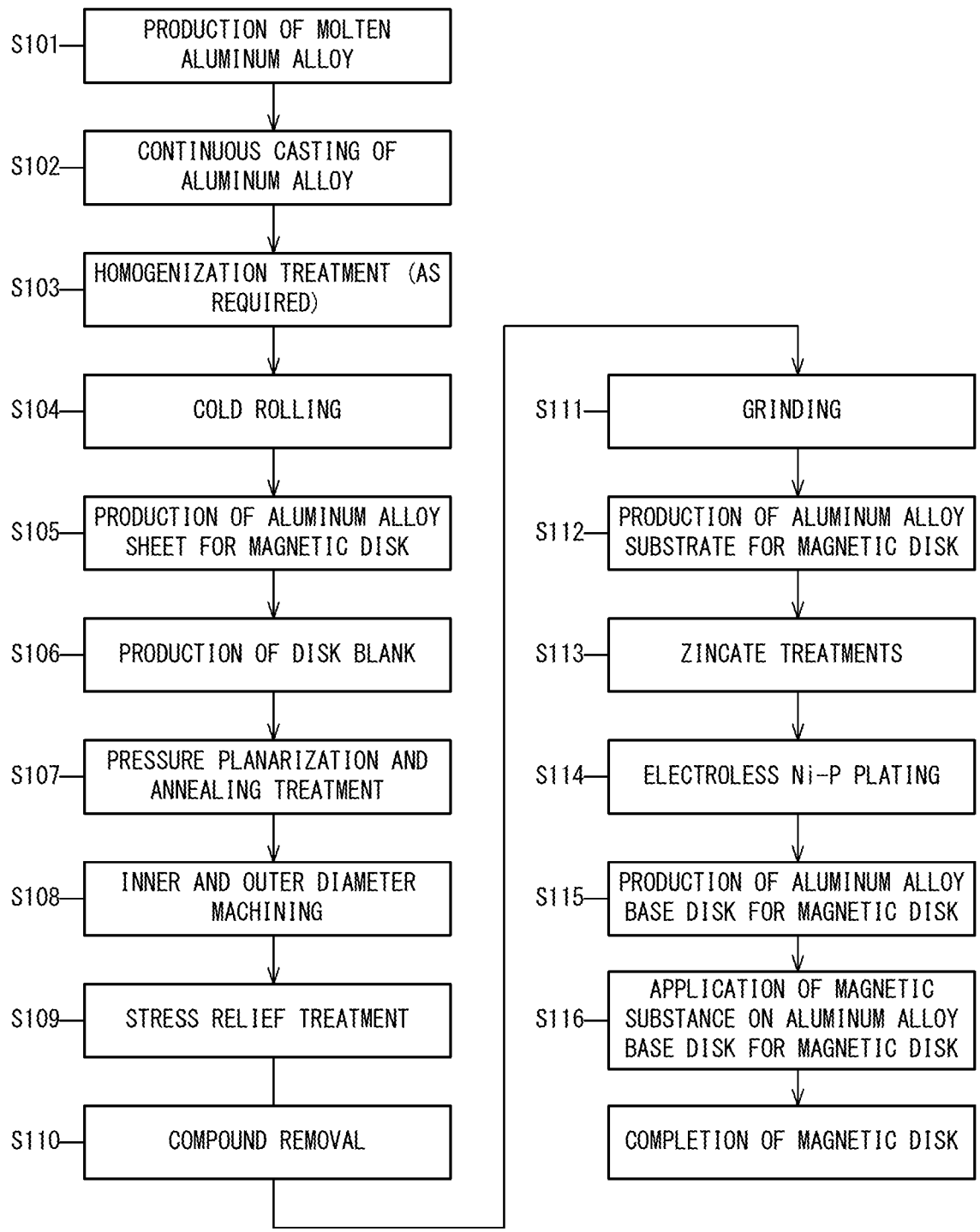
FIG. 4 is a flow diagram showing a method for manufacturing an aluminum alloy substrate for a magnetic disk, an aluminum alloy base disk for a magnetic disk, and a magnetic disk, according to the present disclosure, wherein a CC casting method is employed for a method for casting an aluminum alloy.

With reference to FIG. 4, the method for of manufacturing the aluminum alloy substrate for a magnetic disk according to the second disclosure will be described. The aluminum alloy substrate according to the disclosure is manufactured by first producing a molten alloy such that the alloy has a predetermined alloy composition (S101), continuously rolling the molten alloy (S102), subjecting an ingot to desired homogenization treatment (S103), executing cold rolling (S104), to manufacture an aluminum alloy sheet (S105). Note that before or during cold rolling, the rolled plate may be subjected to annealing treatment.

Figure 5:
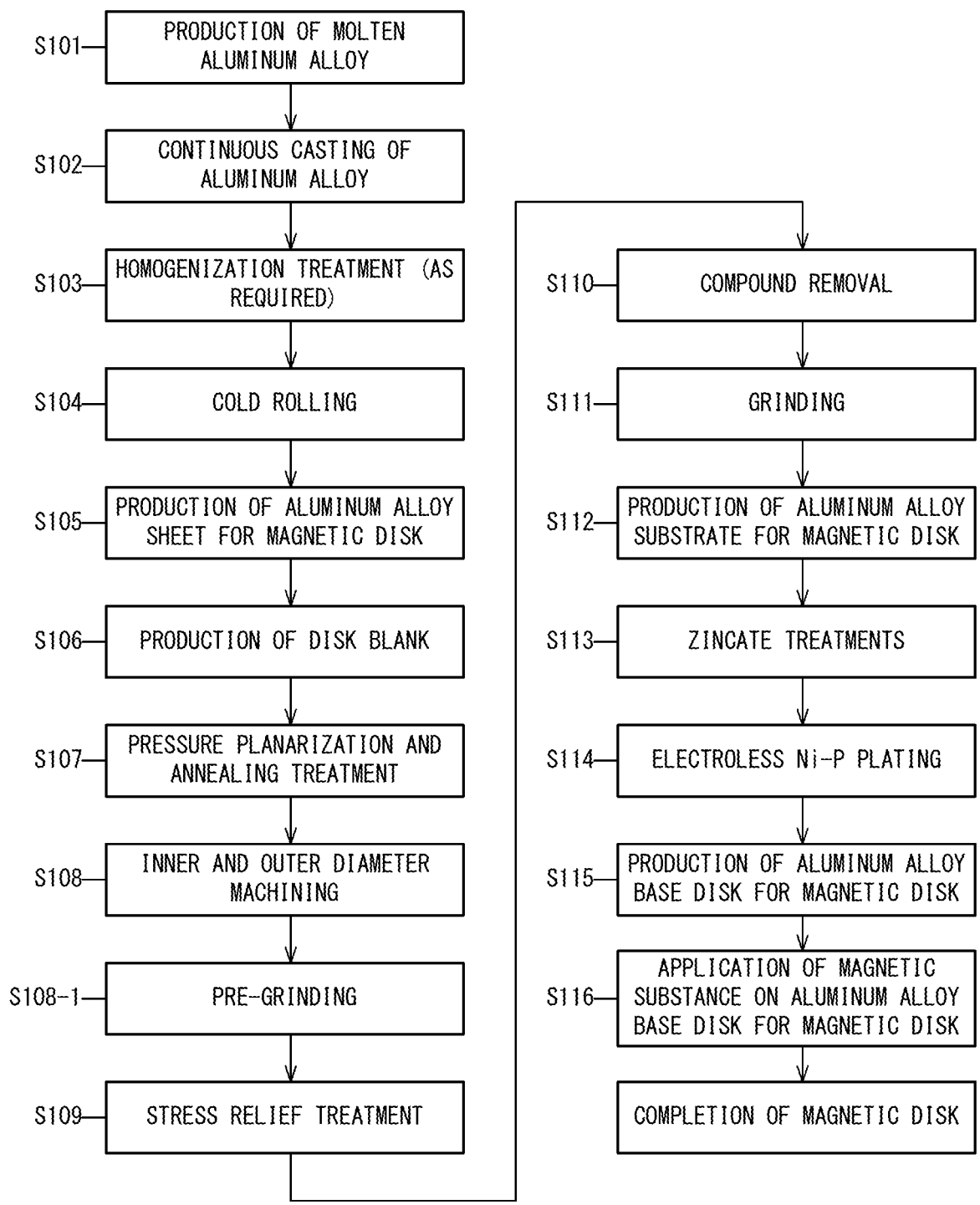
FIG. 5 is a flow diagram showing another method for manufacturing an aluminum alloy substrate for a magnetic disk, an aluminum alloy base disk for a magnetic disk, and a magnetic disk, according to the present disclosure, wherein the CC casting method is employed for the method for casting an aluminum alloy.
Figure 6:
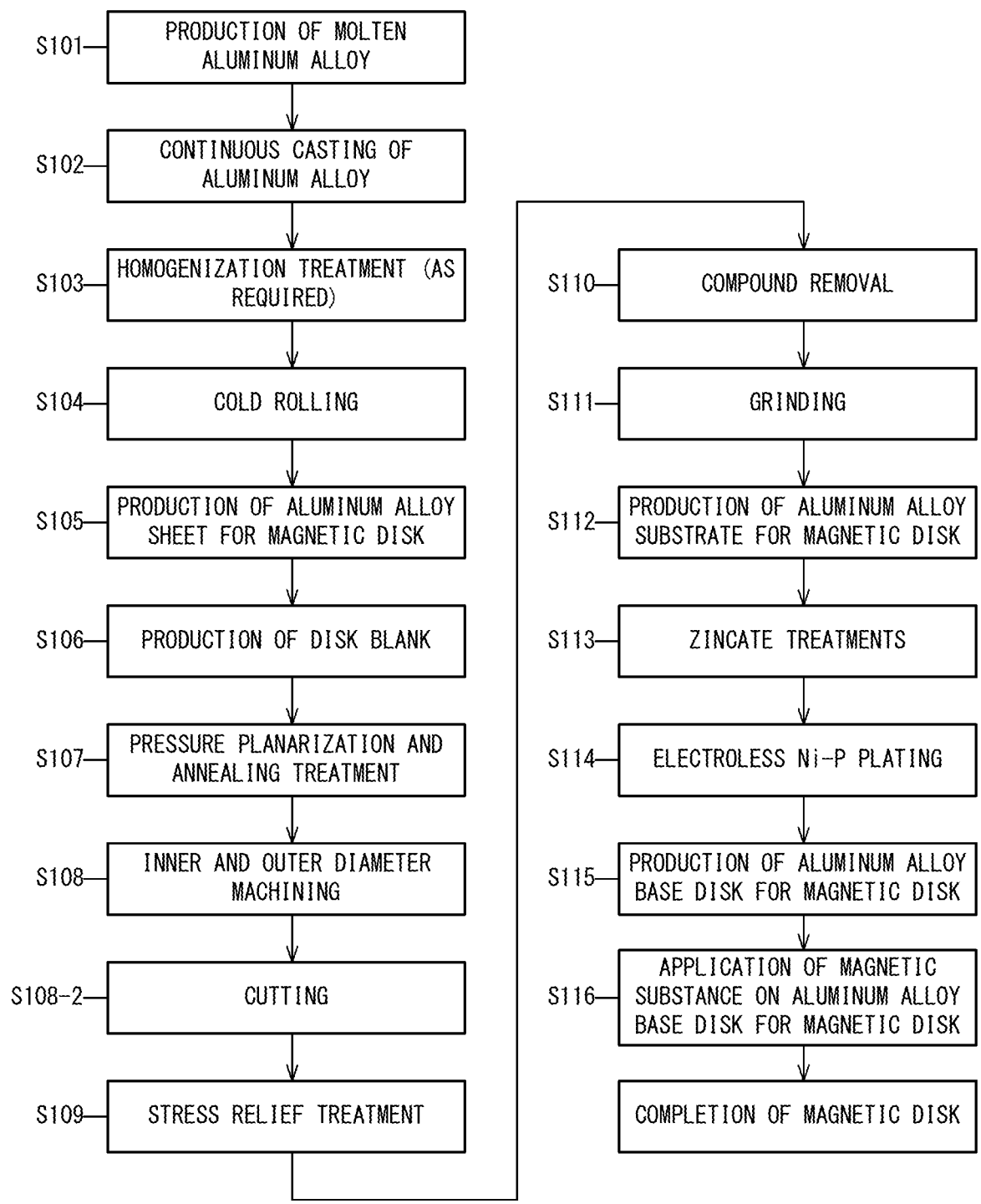
FIG. 6 is a flow diagram showing still another method for manufacturing an aluminum alloy substrate for a magnetic disk, an aluminum alloy base disk for a magnetic disk, and a magnetic disk, according to the present disclosure, wherein the CC casting method is employed for the method for casting an aluminum alloy.

The aluminum alloy sheet thus made is stamped into an annular shape to form an annular disk blank (S106), and this disk blank is subjected to pressure planarization and annealing treatment (S107). Further, the inner and outer peripheral surfaces of the disk blank are subjected to inner and outer diameter machining (S1089), and the disk blank is subjected to stress relief heat treatment (S109), compound removal (S110), and grinding (S111). Instead of the steps of S108 to S11, as shown in FIG. 5, after the inner and outer peripheral surfaces of the disk blank are subjected to inner and outer diameter machining (S108), and the disk blank may be subjected to pre-grinding (S108-1), stress relief heat treatment (S109), compound removal (S110), and grinding (S111). Further alternatively, as shown in FIG. 6, after the inner and outer peripheral surfaces of the disk blank are subjected to inner and outer diameter machining (S108), and the disk blank may be subjected to lathing (S108-2), stress relief heat treatment (S109), compound removal (S110), and grinding (S111). Thus, the disk blank is formed into the aluminum alloy substrate for a magnetic disk (S112). Hereafter, the steps are described in detail.

9-2. Casting Step

First, a molten aluminum alloy is prepared according to a usual method by heating and dissolution such that the aluminum alloy has a predetermined composition range. The thus prepared molten aluminum alloy is cast by a continuous casting method (CC casting method) to form a thin aluminum alloy plate having a thickness of approximately 2.0 to 10.0 mm. Here, in the continuous casting method, the molten metal is supplied between a pair of rolls (alternatively belt casters or block casters) through a casting nozzle, and is cooled by the rollers, to directly cast a rolled plate of the aluminum alloy. In casting a thin rolled plate of the aluminum alloy by the continuous casting method, it is preferably to set the temperature of the rolled plate at the lapse of one minute after being cast to 230 to 350° C. Further, the temperature of the rolled plate at the lapse of ten minutes after being cast to 150° C. or higher and lower than 230° C. Thus, by setting the temperature of the rolled pate at the lapse of one minute to 230 to 350° C. and the temperature of the rolled pate at the lapse of ten minutes after being cast to 150° C. or higher and lower than 230° C., it is possible to disperse a large number of fine second phase particle (mainly Al—Fe compounds) and thereby obtain the effect of strength improvement. By dispersing a large number of such fine second particles, it is possible to further achieve the effect of strength improvement compared with the DC casting method. Note that as a method for cooling the cast plate in the CC casting method, it is possible to employ air cooling with a fan, mist cooling, shower cooling, water cooling, and the like.

9-3. Homogenization Treatment Step

Next, the cast aluminum alloy ingot is subjected to homogenization treatment as required. The conditions of homogenization treatment are not particularly limited. For example, the heating conditions are preferably set to 300 to 450° C. and 0.5 to 24 hours. This suppresses non-uniformity of sizes of second phase particles, whereby it is possible to obtain the effect of reducing variation in the strength and fluttering characteristic of the aluminum alloy substrate.

9-4. Cold Rolling Step

Next, the hot-rolled plate is cold-rolled into a cold-rolled sheet having a thickness of 0.45 to 1.8 mm. Thus, the hot-rolled late is cold-rolled to a required product thickness. The conditions of cold rolling are not particularly limited, but they are only required to be determined according to a required product sheet strength and thickness, and a cold-rolling ratio is preferably set to 10 to 95%. Before or during cold rolling, there may be provided an annealing step for ensuring cold rolling workability. In a case where annealing is executed, for batch-type annealing, for example, the conditions are a temperature of 200° C. or higher and 380° C. or lower and a treatment time of 0.1 to 10 hours.

9-5. Disk blank-Stamping Step and Pressure Planarization and Annealing Treatment Step The aluminum alloy sheet made as described above is stamped into an annular shape to prepare an annular aluminum alloy sheet. Then, pressure planarization and annealing treatment is conducted on the annular aluminum alloy sheet at 220 to 450° C. for 30 minutes or more, to prepare a flattened annular disk blank.

9-6 Machining Step, Stress Relief Heat Treatment and Compound Removal Step

Next, the flattened disk blank is subjected, as shown in FIG. 1, to inner and outer diameter machining (S108), stress relief heat treatment (S109), compound removal (S110) and grinding (S111), or as shown in FIG. 2, the pre-grinding step (S108-1) is provided between the steps 108 and S109 appearing in FIG. or alternatively, as shown in FIG. 3, the lathing step (S108-2) is provided between the steps 108 and S109 appearing in FIG. 1. Here, in the stress relief heat treatment step, the aluminum alloy sheet is subjected to heat treatment preferably at a temperature of 250 to 400° C. for 5 to 15 minutes. Further, the compound removal (S110) is executed as described above. Thus, the aluminum alloy substrate is obtained.

10. Method for Manufacturing Aluminum Alloy Base Disk for Magnetic Disk

The step of producing an aluminum alloy base disk by treating the aluminum alloy substrate made as described above is the same for the aluminum alloy substrate manufactured in the first disclosure and the aluminum alloy substrate manufactured in the second disclosure. More specifically, after the surfaces of the aluminum alloy substrate are subjected to degreasing treatment, acid etching treatment, and desmutting treatment, the surfaces are subjected to zincate treatment (Zn substitution treatment) (S114 in FIG. 1 and S113 in FIG. 4). Further, the surfaces of the aluminum alloy substrate subjected to the zincate treatment are subjected to Ni—P plating treatment as undercoat treatment (S115 in FIG. 1 and S114 in FIG. 4). Thus, the aluminum alloy base disk for a magnetic disk is made (S116 in FIG. 1 and S115 in FIG. 4). Hereafter, the above-mentioned steps will be described in detail.

Degreasing treatment is preferably performed by using a commercially available degreasing solution of AD-68F (made by C. Uyemura & Co., Ltd.), under the conditions of a temperature of 40 to 70° C., a treatment time of 3 to 10 minutes, and a concentration of 200 to 800 mL/L. Acid etching treatment is preferably performed by using a commercially available degreasing solution of AD-107F (made by C. Uyemura & Co., Ltd.), under the conditions of a temperature of 50 to 75° C., a treatment time of 0.5 to 5 minutes, and a concentration of 20 to 100 mL/L. After the acid etching treatment, usual desmutting treatment is preferably performed using $HNO_3$ under the conditions of a temperature of 15 to 40° C., a treatment time of 10 to 120 seconds, and a concentration of 10 to 60%.

1st zincate treatment is performed by using a commercially available zincate treatment solution of AD-301F-3X (made by C. Uyemura & Co., Ltd.), under the conditions of a temperature of 10 to 35° C., a treatment time of 0.1 to 5 minutes, and a concentration of 100 to 500 mL/L. After the 1st zincate treatment, Zn peeling treatment is preferably performed using $HNO_3$ under the conditions of a temperature of 15 to 40° C., a treatment time of 10 to 120 seconds, and a concentration of 10 to 60%. Thereafter, 2nd zincate treatment is conducted under the same conditions as the 1st zincate treatment.

An electroless Ni—P plating treatment step is performed as undercoat plating treatment on the surfaces of the aluminum alloy base material subjected to 2nd zincate treatment (S115 in FIG. 1 and S114 in FIG. 4). Electroless Ni—P plating treatment is preferably performed using a commercially available plating solution of Nimden HDX (made by C. Uyemura & Co., Ltd.) or the like, under the conditions of a temperature of 80 to 95° C., a treatment time of 30 to 180 minutes, a Ni concentration of 3 to 10 g/L.

Through the plating pretreatment step and the Ni—P plating treatment step, an undercoat-plated aluminum alloy base disk for a magnetic disk is obtained (S116 in FIG. 1 and S115 in FIG. 4).

11. Manufacturing of Magnetic Disk

Finally, the front surface of the aluminum alloy base disk subjected to the undercoat plating treatment is made flat and smooth by polishing, and an undercoat layer is provided on the polished front surface, whereafter a magnetic layer is formed on the undercoat layer by application through spattering (S117 in FIG. 1 and S116 in FIG. 4), to produce a magnetic disk. Note that it is preferable to further provide a protective film and a lubricant layer on the magnetic layer.

EMBODIMENTS

Hereafter, the present disclosure will be described in more detail with reference to Embodiments, which should not be construed as limiting the scope of the invention.

1. First Embodiment

Examples 1 to 47 and Comparative Examples 1 to 23

In the first embodiment, examples are shown in which the DC casting method was used as the method for casting an aluminum alloy.

First, each of aluminum alloys having respective compositions shown in Table 1 was melted in accordance with a usual method to prepare a molten aluminum alloy. Next, the molten aluminum alloy was cast by the DC method to produce an ingot. Opposite sides of the ingot was face-cut to a depth of 15 mm and the ingot was subjected to homogenization treatment at 520° C. for one hours. Then, hot rolling was conducted at a hot-rolling start temperature of 460° C. and a hot-rolling end temperature of 280° C. to form a hot-rolled plate having a thickness of 3.0 mm. The hot-rolled plate was cold-rolled (at a reduction ratio of 73.3%) to a thickness of 0.8 mm to yield a final rolled sheet. The aluminum alloy sheet thus obtained was stamped into an annular shape having an outer diameter of 98 mm and an inner diameter of 24 mm to produce an annular aluminum alloy sheet. Note that in FIG. 1, "–" indicates less than the measurement limit.

TABLE 1

| ALLOY No. | COMPOSITION (mass %) | | | | | | | | | Al + INEVITABLE IMPURITIES |
|---|---|---|---|---|---|---|---|---|---|---|
| | Fe | Cu | Zn | Mn | Si | Ni | Cr | Zr | Ti | |
| A1 | 1.2 | 0.020 | 0.500 | 0.7 | 0.2 | — | — | — | — | Bal. |
| A2 | 1.3 | 0.010 | 0.300 | 0.5 | — | — | — | — | — | Bal. |
| A3 | 0.5 | 0.010 | 0.300 | 0.2 | 0.2 | 0.5 | — | — | — | Bal. |
| A4 | 0.1 | 0.020 | 0.500 | — | — | — | — | — | — | Bal. |
| A5 | 3.0 | 0.020 | 0.500 | — | — | — | — | — | — | Bal. |
| A6 | 1.2 | 0.005 | 0.500 | — | — | — | — | — | — | Bal. |
| A7 | 1.2 | 1.000 | 0.500 | — | — | — | — | — | — | Bal. |
| A8 | 1.2 | 0.020 | 0.005 | — | — | — | — | — | — | Bal. |
| A9 | 1.2 | 0.020 | 1.000 | — | — | — | — | — | — | Bal. |
| A10 | 1.2 | 0.020 | 0.500 | 0.1 | — | — | — | — | — | Bal. |
| A11 | 1.2 | 0.020 | 0.500 | 3.0 | — | — | — | — | — | Bal. |
| A12 | 1.2 | 0.020 | 0.500 | — | 0.1 | — | — | — | — | Bal. |
| A13 | 1.2 | 0.020 | 0.500 | — | 3.0 | — | — | — | — | Bal. |
| A14 | 1.2 | 0.020 | 0.500 | — | — | 0.1 | — | — | — | Bal. |
| A15 | 1.2 | 0.020 | 0.500 | — | — | 8.0 | — | — | — | Bal. |
| A16 | 1.2 | 0.020 | 0.500 | — | — | — | 0.01 | — | — | Bal. |
| A17 | 1.2 | 0.020 | 0.500 | — | — | — | 1.00 | — | — | Bal. |
| A18 | 1.2 | 0.020 | 0.500 | — | — | — | — | 0.01 | — | Bal. |
| A19 | 1.2 | 0.020 | 0.500 | — | — | — | — | 1.00 | — | Bal. |
| A20 | 1.2 | 0.020 | 0.500 | — | — | — | — | — | 0.005 | Bal. |
| A21 | 1.2 | 0.020 | 0.500 | — | — | — | — | — | 0.500 | Bal. |
| B1 | 0.05 | 0.020 | 0.500 | 0.7 | — | — | — | — | — | Bal. |

TABLE 1-continued

| | COMPOSITION (mass %) | | | | | | | | |
|---|---|---|---|---|---|---|---|---|---|
| ALLOY No. | Fe | Cu | Zn | Mn | Si | Ni | Cr | Zr | Ti | Al + INEVITABLE IMPURITIES |
| B2 | 3.5 | 0.020 | 0.500 | 0.7 | — | — | — | — | — | Bal. |
| B3 | 1.2 | 0.002 | 0.500 | 0.7 | — | — | — | — | — | Bal. |
| B4 | 1.2 | 1.500 | 0.500 | 0.7 | — | — | — | — | — | Bal. |
| B5 | 1.2 | 0.020 | 0.002 | 0.7 | — | — | — | — | — | Bal. |
| B6 | 1.2 | 0.020 | 1.500 | 0.7 | — | — | — | — | — | Bal. |
| B7 | 1.2 | 0.020 | 0.500 | 0.07 | — | — | — | — | — | Bal. |
| B8 | 1.2 | 0.020 | 0.500 | 3.5 | — | — | — | — | — | Bal. |
| B9 | 1.2 | 0.020 | 0.500 | 0.7 | 4.0 | — | — | — | — | Bal. |
| B10 | 1.2 | 0.020 | 0.500 | 0.7 | — | 10.0 | — | — | — | Bal. |
| B11 | 1.2 | 0.020 | 0.500 | 0.7 | — | — | 1.50 | — | — | Bal. |
| B12 | 1.2 | 0.020 | 0.500 | 0.7 | — | — | — | 1.50 | — | Bal. |

The annular aluminum alloy sheet thus obtained was subjected to pressure planarization and annealing under a pressure of 1.5 MPa at 300° C. for 3 hours to yield a disk blank. An aluminum alloy substrate was made by executing steps shown in Tables 2 and 3, and an outer peripheral surface of the aluminum alloy substrate was observed for evaluation. Note that the aluminum alloy sheet was subjected to inner and outer diameter lathing such that it was formed into a shape having an outer diameter of 97 mm and an inner diameter of 25 mm. Note that in Tables 2 and 3, "↑" indicates that values are the same as in the upper row. For example, in the case of inner and outer diameter machining, C1 has the same "outer diameter of 97 mm and inner diameter of 25 mm" as entered in the upper row, and similarly thereafter, C3 to C27 has the "outer diameter of 97 mm and inner diameter of 25 mm". This also similarly applies to stress relief heat treatment and so forth.

TABLE 2

| | INNER AND OUTER DIAMETER MACHINING | | | STRESS RELIEF HEAT | COMPOUND REMOVAL STEP | | | |
|---|---|---|---|---|---|---|---|---|
| STEP No. | OUTER DIAMETER 97 mm INNER DIAMETER 25 mm | LATHING | PRE-GRINDING | TREAT-MENT (300° C., 10 min) | HF CONCEN-TRATION (g/L) | HNO₃ CONCEN-TRATION (mass %) | SOLUTION TEMPER-ATURE (° C.) | TREAT-MENT TIME (min) |
| C1 | ↑ | — | — | ↑ | 40 | 50 | 25 | 20 |
| C2 | ↑ | — | — | ↑ | 10 | 50 | 25 | 20 |
| C3 | ↑ | — | — | ↑ | 80 | 50 | 25 | 20 |
| C4 | ↑ | — | — | ↑ | 40 | 10 | 25 | 20 |
| C5 | ↑ | — | — | ↑ | 40 | 60 | 25 | 20 |
| C6 | ↑ | — | — | ↑ | 40 | 50 | 10 | 20 |
| C7 | ↑ | — | — | ↑ | 40 | 50 | 30 | 20 |
| C8 | ↑ | — | — | ↑ | 40 | 50 | 25 | 5 |
| C9 | ↑ | — | — | ↑ | 40 | 50 | 25 | 60 |
| C10 | ↑ | — | 10 μm (ONE SIDE) | ↑ | 40 | 50 | 25 | 20 |
| C11 | ↑ | — | 10 μm (ONE SIDE) | ↑ | 10 | 50 | 25 | 20 |
| C12 | ↑ | — | 10 μm (ONE SIDE) | ↑ | 80 | 50 | 25 | 20 |
| C13 | ↑ | — | 10 μm (ONE SIDE) | ↑ | 40 | 10 | 25 | 20 |
| C14 | ↑ | — | 10 μm (ONE SIDE) | ↑ | 40 | 60 | 25 | 20 |
| C15 | ↑ | — | 10 μm (ONE SIDE) | ↑ | 40 | 50 | 10 | 20 |
| C16 | ↑ | — | 10 μm (ONE SIDE) | ↑ | 40 | 50 | 30 | 20 |
| C17 | ↑ | — | 10 μm (ONE SIDE) | ↑ | 40 | 50 | 25 | 5 |
| C18 | ↑ | — | 10 μm (ONE SIDE) | ↑ | 40 | 50 | 25 | 60 |
| C19 | ↑ | 10 μm (ONE SIDE) | — | ↑ | 40 | 50 | 25 | 20 |
| C20 | ↑ | 10 μm (ONE SIDE) | — | ↑ | 10 | 50 | 25 | 20 |
| C21 | ↑ | 10 μm (ONE SIDE) | — | ↑ | 80 | 50 | 25 | 20 |
| C22 | ↑ | 10 μm (ONE SIDE) | — | ↑ | 40 | 10 | 25 | 20 |
| C23 | ↑ | 10 μm (ONE SIDE) | — | ↑ | 40 | 60 | 25 | 20 |

TABLE 2-continued

| C24 | ↑ | 10 μm (ONE SIDE) | — | ↑ | 40 | 50 | 10 | 20 |
| C25 | ↑ | 10 μm (ONE SIDE) | — | ↑ | 40 | 50 | 30 | 20 |
| C26 | ↑ | 10 μm (ONE SIDE) | — | ↑ | 40 | 50 | 25 | 5 |
| C27 | ↑ | 10 μm (ONE SIDE) | — | ↑ | 40 | 50 | 25 | 60 |

| STEP No. | GRINDING | ALKALINE DE-GREASING AD-68F (400 mL/L) (50° C., 5 min) | ACID ETCHING AD-107F (50 mL/L) (60° C., 3 min) | DESMUTTING $HNO_3$ (30 mass %) (25° C., 50 sec) | 1st ZINCATE AD-301F (300 mL/L) (25° C., 50 sec) | Zn PEELING $HNO_3$ (30 mass %) (25° C., 50 sec) | 2nd ZINCATE AD-301F (300 mL/L) (25° C., 1 min) | ELECTRO-LESS Ni—P PLATING HDX (90° C., 120 min) |
|---|---|---|---|---|---|---|---|---|
| C1 | 15 μm (ONE SIDE) | ↑ | ↑ | ↑ | ↑ | ↑ | ↑ | ↑ |
| C2 | 15 μm (ONE SIDE) | ↑ | ↑ | ↑ | ↑ | ↑ | ↑ | ↑ |
| C3 | 15 μm (ONE SIDE) | ↑ | ↑ | ↑ | ↑ | ↑ | ↑ | ↑ |
| C4 | 15 μm (ONE SIDE) | ↑ | ↑ | ↑ | ↑ | ↑ | ↑ | ↑ |
| C5 | 15 μm (ONE SIDE) | ↑ | ↑ | ↑ | ↑ | ↑ | ↑ | ↑ |
| C6 | 15 μm (ONE SIDE) | ↑ | ↑ | ↑ | ↑ | ↑ | ↑ | ↑ |
| C7 | 15 μm (ONE SIDE) | ↑ | ↑ | ↑ | ↑ | ↑ | ↑ | ↑ |
| C8 | 15 μm (ONE SIDE) | ↑ | ↑ | ↑ | ↑ | ↑ | ↑ | ↑ |
| C9 | 15 μm (ONE SIDE) | ↑ | ↑ | ↑ | ↑ | ↑ | ↑ | ↑ |
| C10 | 5 μm (ONE SIDE) | ↑ | ↑ | ↑ | ↑ | ↑ | ↑ | ↑ |
| C11 | 5 μm (ONE SIDE) | ↑ | ↑ | ↑ | ↑ | ↑ | ↑ | ↑ |
| C12 | 5 μm (ONE SIDE) | ↑ | ↑ | ↑ | ↑ | ↑ | ↑ | ↑ |
| C13 | 5 μm (ONE SIDE) | ↑ | ↑ | ↑ | ↑ | ↑ | ↑ | ↑ |
| C14 | 5 μm (ONE SIDE) | ↑ | ↑ | ↑ | ↑ | ↑ | ↑ | ↑ |
| C15 | 5 μm (ONE SIDE) | ↑ | ↑ | ↑ | ↑ | ↑ | ↑ | ↑ |
| C16 | 5 μm (ONE SIDE) | ↑ | ↑ | ↑ | ↑ | ↑ | ↑ | ↑ |
| C17 | 5 μm (ONE SIDE) | ↑ | ↑ | ↑ | ↑ | ↑ | ↑ | ↑ |
| C18 | 5 μm (ONE SIDE) | ↑ | ↑ | ↑ | ↑ | ↑ | ↑ | ↑ |
| C19 | 5 μm (ONE SIDE) | ↑ | ↑ | ↑ | ↑ | ↑ | ↑ | ↑ |
| C20 | 5 μm (ONE SIDE) | ↑ | ↑ | ↑ | ↑ | ↑ | ↑ | ↑ |
| C21 | 5 μm (ONE SIDE) | ↑ | ↑ | ↑ | ↑ | ↑ | ↑ | ↑ |
| C22 | 5 μm (ONE SIDE) | ↑ | ↑ | ↑ | ↑ | ↑ | ↑ | ↑ |
| C23 | 5 μm (ONE SIDE) | ↑ | ↑ | ↑ | ↑ | ↑ | ↑ | ↑ |
| C24 | 5 μm (ONE SIDE) | ↑ | ↑ | ↑ | ↑ | ↑ | ↑ | ↑ |
| C25 | 5 μm (ONE SIDE) | ↑ | ↑ | ↑ | ↑ | ↑ | ↑ | ↑ |
| C26 | 5 μm (ONE SIDE) | ↑ | ↑ | ↑ | ↑ | ↑ | ↑ | ↑ |
| C27 | 5 μm (ONE SIDE) | ↑ | ↑ | ↑ | ↑ | ↑ | ↑ | ↑ |

TABLE 3

| STEP No. | INNER AND OUTER DIAMETER MACHINING OUTER DIAMETER 97 mm INNER DIAMETER 25 mm | LATHING | PRE-GRINDING | STRESS RELIEF HEAT TREATMENT (300° C., 10 min) | COMPOUND REMOVAL STEP HF CONCENTRATION (g/L) | HNO₃ CONCENTRATION (mass %) | SOLUTION TEMPERATURE (° C.) | TREATMENT TIME (min) |
|---|---|---|---|---|---|---|---|---|
| D1 | ↑ | — | — | ↑ | NONE | NONE | NONE | NONE |
| D2 | ↑ | — | 10 μm (ONE SIDE) | ↑ | NONE | NONE | NONE | NONE |
| D3 | ↑ | 10 μm (ONE SIDE) | — | ↑ | NONE | NONE | NONE | NONE |
| D4 | ↑ | — | 10 μm (ONE SIDE) | ↑ | 5 | 50 | 25 | 20 |
| D5 | ↑ | — | 10 μm (ONE SIDE) | ↑ | 100 | 50 | 25 | 20 |
| D6 | ↑ | — | 10 μm (ONE SIDE) | ↑ | 40 | 5 | 25 | 20 |
| D7 | ↑ | — | 10 μm (ONE SIDE) | ↑ | 40 | 70 | 25 | 20 |
| D8 | ↑ | — | 10 μm (ONE SIDE) | ↑ | 40 | 50 | 5 | 20 |
| D9 | ↑ | — | 10 μm (ONE SIDE) | ↑ | 40 | 50 | 40 | 20 |
| D10 | ↑ | — | 10 μm (ONE SIDE) | ↑ | 40 | 50 | 25 | 2 |
| D11 | ↑ | — | 10 μm (ONE SIDE) | ↑ | 40 | 50 | 25 | 70 |

| STEP No. | GRINDING | ALKALINE DE-GREASING AD-68F (400 mL/L) (50° C., 5 min) | ACID ETCHING AD-107F (50 mL/L) (60° C., 3 min) | DESMUTTING HNO₃ (30 mass %) (25° C., 50 sec) | 1st ZINCATE AD-301F (300 mL/L) (25° C., 50 sec) | Zn PEELING HNO₃ (30 mass %) (25° C., 50 sec) | 2nd ZINCATE AD-301F (300 mL/L) (25° C., 1 min) | ELECTROLESS Ni—P PLATING HDX (90° C., 120 min) |
|---|---|---|---|---|---|---|---|---|
| D1 | 15 μm (ONE SIDE) | ↑ | ↑ | ↑ | ↑ | ↑ | ↑ | ↑ |
| D2 | 5 μm (ONE SIDE) | ↑ | ↑ | ↑ | ↑ | ↑ | ↑ | ↑ |
| D3 | 5 μm (ONE SIDE) | ↑ | ↑ | ↑ | ↑ | ↑ | ↑ | ↑ |
| D4 | 5 μm (ONE SIDE) | ↑ | ↑ | ↑ | ↑ | ↑ | ↑ | ↑ |
| D5 | 5 μm (ONE SIDE) | ↑ | ↑ | ↑ | ↑ | ↑ | ↑ | ↑ |
| D6 | 5 μm (ONE SIDE) | ↑ | ↑ | ↑ | ↑ | ↑ | ↑ | ↑ |
| D7 | 5 μm (ONE SIDE) | ↑ | ↑ | ↑ | ↑ | ↑ | ↑ | ↑ |
| D8 | 5 μm (ONE SIDE) | ↑ | ↑ | ↑ | ↑ | ↑ | ↑ | ↑ |
| D9 | 5 μm (ONE SIDE) | ↑ | ↑ | ↑ | ↑ | ↑ | ↑ | ↑ |
| D10 | 5 μm (ONE SIDE) | ↑ | ↑ | ↑ | ↑ | ↑ | ↑ | ↑ |
| D11 | 5 μm (ONE SIDE) | ↑ | ↑ | ↑ | ↑ | ↑ | ↑ | ↑ |

Thereafter, the aluminum alloy substrate was subjected to plating pretreatment. First, alkaline degreasing was conducted using AD-68F (made by C. Uyemura & Co., Ltd.) with a concentration of 400 mL/L at 50° C. for 5 minutes, and then acid etching was conducted using AD-107F (made by C. Uyemura & Co., Ltd.) with a concentration of 50 mL/L at 60° C. for 3 minutes. Further, desmutting was conducted using a 30% HNO₃ aqueous solution at room temperature (25° C.) for 50 seconds. Then, 1st zincate treatment was conducted using a zincate treatment solution (AD-301F made by C. Uyemura & Co., Ltd.) with a concentration of 300 mL/L at 25° C. for 50 seconds. After the 1st zincate treatment, peeling of a zincate (Zn) layer was conducted using a 30% HNO₃ aqueous solution (25° C.) for 60 seconds, and 2nd zincate treatment was conducted using a zincate treatment solution (AD-301F made by C. Uyemura & Co., Ltd.) with a concentration of 300 mL/L at 25° C. for one minute.

On the aluminum alloy substrate subjected to the 2nd zincate treatment, electroless plating of Ni—P was conducted using an electroless Ni—P plating solution (Nimden HDX, made by C. Uyemura & Co., Ltd.) at 90° C. to a thickness of 14 (120 minutes), and then finish polishing was conducted using a feather cloth (one-side polishing quantity of 4 μm) to obtain an aluminum alloy base disk for evaluation. Then, evaluation was performed by observing an outer peripheral surface of the aluminum alloy base disk.

Evaluation 1: Observation of Outer Peripheral Surface After Grinding

An aluminum alloy substrate after grinding immediately before plating pretreatment was used as a sample for evaluation, and an outer peripheral surface of the aluminum alloy substrate was photographed at a magnification of 2000 times via five fields of view using a digital microscope (VHX-6000 made by Keyence Corporation). From the photographed images, the maximum diameters and number of holes were measured for evaluation. The number of holes per 1 mm² was calculated as an average of values thereof obtained via the five fields of view. When the number of holes having a maximum diameter of 10 um or more was less than 100/mm², an evaluation of "Excellent" (A) was given, when the same was 100/mm² or more and 200/mm² or less, an evaluation of "Good" (B) was given, and when the same was more than 200/mm², an evaluation of "Poor" (C) was given. "Excellent" (A) and "Good" (B) were regarded as acceptable and "Poor" (C) was regarded as unacceptable. Results are shown in Tables 4 and 5.

TABLE 4

| | ALLOY | STEP | OUTER PERIPHERAL SURFACE OF ALUMINUM ALLOY SUBSTRATE | OUTER PERIPHERAL SURFACE OF ALUMINUM ALLOY BASE DISK | PLATING SMOOTHNESS | FLUTTERING CHARACTERISTIC |
|---|---|---|---|---|---|---|
| EXAMPLE 1 | A1 | C1 | A | A | A | A |
| EXAMPLE 2 | A1 | C10 | A | A | A | A |
| EXAMPLE 3 | A1 | C19 | A | A | A | A |
| EXAMPLE 4 | A2 | C1 | A | A | A | A |
| EXAMPLE 5 | A3 | C1 | A | A | A | A |
| EXAMPLE 6 | A4 | C1 | B | B | B | B |
| EXAMPLE 7 | A5 | C1 | B | B | B | A |
| EXAMPLE 8 | A6 | C1 | B | B | B | B |
| EXAMPLE 9 | A7 | C1 | B | B | B | A |
| EXAMPLE 10 | A8 | C1 | B | B | B | B |
| EXAMPLE 11 | A9 | C1 | B | B | B | A |
| EXAMPLE 12 | A10 | C1 | A | A | A | B |
| EXAMPLE 13 | A11 | C1 | B | B | B | A |
| EXAMPLE 14 | A12 | C1 | A | A | A | A |
| EXAMPLE 15 | A13 | C1 | B | B | B | A |
| EXAMPLE 16 | A14 | C1 | A | A | A | A |
| EXAMPLE 17 | A15 | C1 | B | B | B | A |
| EXAMPLE 18 | A16 | C1 | A | A | A | A |
| EXAMPLE 19 | A17 | C1 | A | A | A | A |
| EXAMPLE 20 | A18 | C1 | A | A | A | A |
| EXAMPLE 21 | A19 | C1 | A | A | A | A |
| EXAMPLE 22 | A20 | C1 | A | A | A | A |
| EXAMPLE 23 | A21 | C1 | B | B | B | A |
| COMPARATIVE EXAMPLE 1 | B1 | C1 | A | A | A | C |
| COMPARATIVE EXAMPLE 2 | B2 | C1 | C | C | C | A |
| COMPARATIVE EXAMPLE 3 | B3 | C1 | B | B | C | C |
| COMPARATIVE EXAMPLE 4 | B4 | C1 | C | C | C | A |
| COMPARATIVE EXAMPLE 5 | B5 | C1 | B | B | C | C |
| COMPARATIVE EXAMPLE 6 | B6 | C1 | C | C | C | A |
| COMPARATIVE EXAMPLE 7 | B7 | C1 | A | A | A | C |
| COMPARATIVE EXAMPLE 8 | B8 | C1 | C | C | C | A |
| COMPARATIVE EXAMPLE 9 | B9 | C1 | C | C | C | A |
| COMPARATIVE EXAMPLE 10 | B10 | C1 | — | — | — | — |
| COMPARATIVE EXAMPLE 11 | B11 | C1 | C | C | C | A |
| COMPARATIVE EXAMPLE 12 | B12 | C1 | C | C | C | A |

TABLE 5

| | ALLOY | STEP | OUTER PERIPHERAL SURFACE OF ALUMINUM ALLOY SUBSTRATE | OUTER PERIPHERAL SURFACE OF ALUMINUM ALLOY BASE DISK | PLATING SMOOTHNESS | FLUTTERING CHARACTERISTIC |
|---|---|---|---|---|---|---|
| EXAMPLE 24 | A1 | C2 | A | A | A | A |
| EXAMPLE 25 | A1 | C3 | B | B | B | A |
| EXAMPLE 26 | A1 | C4 | A | A | A | A |
| EXAMPLE 27 | A1 | C5 | A | A | A | A |
| EXAMPLE 28 | A1 | C6 | B | B | B | A |
| EXAMPLE 29 | A1 | C7 | B | B | B | A |
| EXAMPLE 30 | A1 | C8 | B | B | B | A |
| EXAMPLE 31 | A1 | C9 | A | A | A | A |
| EXAMPLE 32 | A1 | C11 | A | A | A | A |
| EXAMPLE 33 | A1 | C12 | B | B | B | A |
| EXAMPLE 34 | A1 | C13 | A | A | A | A |
| EXAMPLE 35 | A1 | C14 | A | A | A | A |
| EXAMPLE 36 | A1 | C15 | B | B | B | A |
| EXAMPLE 37 | A1 | C16 | B | B | B | A |
| EXAMPLE 38 | A1 | C17 | B | B | B | A |
| EXAMPLE 39 | A1 | C18 | A | A | A | A |
| EXAMPLE 40 | A1 | C20 | A | A | A | A |
| EXAMPLE 41 | A1 | C21 | B | B | B | A |
| EXAMPLE 42 | A1 | C22 | A | A | A | A |
| EXAMPLE 43 | A1 | C23 | A | A | A | A |
| EXAMPLE 44 | A1 | C24 | B | B | B | A |
| EXAMPLE 45 | A1 | C25 | B | B | B | A |
| EXAMPLE 46 | A1 | C26 | B | B | B | A |
| EXAMPLE 47 | A1 | C27 | A | A | A | A |
| COMPARATIVE EXAMPLE 13 | A1 | D1 | A | C | B | A |
| COMPARATIVE EXAMPLE 14 | A1 | D2 | A | C | B | A |
| COMPARATIVE EXAMPLE 15 | A1 | D3 | A | C | B | A |
| COMPARATIVE EXAMPLE 16 | A1 | D4 | B | C | B | A |
| COMPARATIVE EXAMPLE 17 | A1 | D5 | C | C | C | A |
| COMPARATIVE EXAMPLE 18 | A1 | D6 | B | C | C | A |
| COMPARATIVE EXAMPLE 19 | A1 | D7 | B | C | B | A |
| COMPARATIVE EXAMPLE 20 | A1 | D8 | B | C | B | A |
| COMPARATIVE EXAMPLE 21 | A1 | D9 | C | C | C | A |
| COMPARATIVE EXAMPLE 22 | A1 | D10 | B | C | B | A |
| COMPARATIVE EXAMPLE 23 | A1 | D11 | C | C | C | A |

Evaluation 2: Observation of Outer Peripheral Surface of Aluminum Alloy Base Disk After Electroless Ni—P Plating An aluminum alloy base disk after electroless Ni—P plating was used as a sample for evaluation, and an outer peripheral surface of the aluminum alloy base disk was photographed at a magnification of 1000 times via five fields of view using an SEM. From the photographed images, the maximum diameters and number of convex portions were measured for evaluation. The number of convex portions per 1 $mm^2$ was calculated as an average of values thereof obtained via the five fields of view. When the number of convex portions having a maximum diameter of 4 to 10 pm was less than 150/$mm^2$, an evaluation of "Excellent" (A) was given, when the same was 150/$mm^2$ or more and 300/$mm^2$ or less, an evaluation of "Good" (B) was given, and when the same was more than 300/$mm^2$, an evaluation of "Poor" (C) was given. "Excellent" (A) and "Good" (B) were regarded as acceptable and "Poor" (C) was regarded as unacceptable. Results are shown in Tables 4 and 5.

Evaluation 3: Plating Smoothness

An aluminum alloy base disk after electroless Ni—P plating was used as a sample for evaluation, and was immersed in a 50% by volume solution of nitric acid at 50° C. for three minutes to etch the Ni—P plated front surface. Five fields of view of the etched Ni—P plated front surface were photographed using an SEM at a magnification of 5000 times. The area of each field of view was set to 536 $\mu m^2$. The numbers of plating defects were measured based on images obtained by photographing the five fields of view, and the arithmetic mean value of values obtained via the five fields of view was determined. When the arithmetic mean value was less than 5 per field of view, an evaluation of "Excellent" (A) was given, when the same was 5 or more and less than 10 per field of view, an evaluation of "Good" (B) was given, and when the same was 10 or more per field of view, an evaluation of "Poor" (C) was given. "Excellent" (A) and "Good" (B) were regarded as acceptable while "Poor" (C) was regarded as unacceptable. Results are shown in Tables 4 and 5.

Evaluation 4: Fluttering Characteristic

The aluminum alloy base disk after electroless Ni—P plating and surface polishing was used as a sample for evaluation of a fluttering characteristic. Note that evaluation should be performed on a magnetic disk having a magnetic substance applied thereto, as a product, but it was already confirmed that results of evaluation of aluminum alloy base disks do not differ from those of evaluation of magnetic disks.

The fluttering characteristic was evaluated by placing the sample for evaluation on a commercially available hard disk drive in the presence of air. ST2000 (trade name) manufactured by Seagate Technology Inc. was used as the hard disk drive, and a motor to which SLD102 (trade name) manufactured by Techno Alive Co. was directly connected was driven. The rotational speed of the motor was set to 7200 rpm, and a plurality of disks were always set to observe the vibrations of a surface of the top magnetic disk of each disk using LDV1800 (trade name), which is a laser Doppler meter manufactured by ONO SOKKI CO., LTD. The observed vibrations were subjected to spectrum analysis using an FFT analysis apparatus DS3200 (trade name) manufactured by ONO SOKKI CO., LTD. The observation was performed by observing the disk surface through a hole formed in the lid of the hard disk drive. In addition, the evaluation was performed by removing a squeeze plate set in the commercially available hard disk.

A fluttering characteristic was evaluated with the maximum displacement (disk fluttering (nm)) of a broad peak in an approximate range of 300 to 1500 Hz at which fluttering appears. Such a broad peak, referred to as non-repeatable run out (NRRO), is known to have a significant influence on the positioning error of a head. As evaluation of a fluttering characteristic in air, when the maximum displacement is 30 nm or less, an evaluation of "Excellent" (A) was given, when the same was more than 30 nm and 50 nm or less, an evaluation of "Good" (B) was given, and when the same was more than 50 nm, an evaluation of "Poor" (C) was given. "Excellent" (A) and "Good" (B) were regarded as acceptable while "Poor" (C) was regarded as unacceptable. Results are shown in Tables 4 and 5.

Examples 1 to 23 and Comparative Examples 1 to 12 are examples with the varying compositions of aluminum alloys, while Examples 24 to 47 and Comparative Examples 13 to 23 are examples with varying steps of treatment of aluminum alloy substrates.

In Examples 1 to 47, all evaluation results were acceptable because the alloy compositions and the conditions of the compound removal step thereof were within the scope of the present disclosure.

In Comparative Example 1, the number of second phase particles was small because of the small content of Fe, so that the fluttering characteristic was unacceptable.

In Comparative Example 2, the amount of coarse Al—Fe-based compounds was large because of the large content of Fe so that a large number of holes were found after the compound removal step and accordingly a large number of convex portions were also found after Ni—P plating. As a result, plating smoothness was unacceptable.

In Comparative Example 3, the number of second phase particles was small because of the small content of Cu, so that the fluttering characteristic was unacceptable. Further, plating smoothness was unacceptable because a zincate film was non-uniform and defects were generated in the plated front surface.

In Comparative Example 4, the amount of coarse Al—Cu-based compounds was large because of the large content of Cu, so that a large number of holes were found after the compound removal step and accordingly a large number of convex portions were also found after Ni—P plating. As a result, plating smoothness was unacceptable.

In Comparative Example 5, the number of second phase particles was small because of the small content of Zn, so that the fluttering characteristic was unacceptable. In addition, a zincate film was non-uniform, so that defects were generated on the plated front surface, and therefore plating smoothness was unacceptable.

In Comparative Example 6, the potential of a parent phase was too electronegative because of the large content of Zn, and therefore, the parent phase was intensively dissolved in each step of plating treatment, causing generation of a large number of concave and convex portions. As a result, there were found to have been generated convex portions on the outer peripheral surface and defects on the plated front surface after Ni—P plating, so that plating smoothness was unacceptable.

In Comparative Example 7, the number of second phase particles was small because of the small content of Mn, so that the fluttering characteristic was unacceptable.

In Comparative Example 8, the amount of coarse Al—Mn-based compounds was large because of the large content of Mn, so that a large number of holes were found after the compound removal step and accordingly a large number of convex portions were also found after Ni—P plating. As a result, plating smoothness was unacceptable.

In Comparative Example 9, the number of coarse Si particles was large because of the large content of Si, and it was impossible to remove the coarse Si particles even if the compound removal step was applied. Therefore, there were found to have been generated convex portions on the outer peripheral surface and defects on the plated front surface after Ni—P plating, so that plating smoothness was unacceptable.

In Comparative Example 10, it was impossible to perform rolling because of the large content of Ni, so that it was impossible to obtain a sample for evaluation.

In Comparative Example 11, the amount of coarse Al—Cr-based compounds was large because of the large content of Cr, and it was impossible to remove the coarse Al—Cr-based compounds even if the compound removal step was applied. Therefore, there were found to have been generated convex portions on the outer peripheral surface and defects on the plated front surface after Ni—P plating, so that plating smoothness was unacceptable.

In Comparative Example 12, the amount of coarse Al—Zn-based compounds was large because of the large content of Zn, and it was impossible to remove the coarse Al—Zn-based compounds even if the compound removal step was applied. Therefore, there were found to have been generated convex portions on the outer peripheral surface and defects on the plated front surface after Ni—P plating, so that plating smoothness was unacceptable.

In Comparative Examples 13 to 15, the compound removal step was not applied. As a result, although plating smoothness was good due to polishing of the front surface, a large number of convex portions were found on the outer peripheral surface after plating, causing generation of a large number of nodules, so that each Comparative Example was unacceptable.

In Comparative Example 16, it was impossible to sufficiently remove compounds on the outer peripheral surface because of a low concentration of HF in a chemical liquid used for the compound removal step, so that there were found a large number of convex portions on the outer peripheral surface after plating, causing generation of a large number of nodules, so that Comparative Example 16 was unacceptable.

In Comparative Example 17, the amount of dissolution of the aluminum alloy substrate was large because of a high concentration of HF in a chemical liquid used for the compound removal step, and a large number of concave and convex portions were generated, so that there were found a large number of convex portions on the outer peripheral surface and defects on the plated front surface after plating, to produce plating smoothness unacceptable.

In Comparative Example 18, it was impossible to sufficiently remove compounds on the outer peripheral surface because of a low concentration of HF in a chemical liquid used for the compound removal step, so that there were found a large number of convex portions on the outer peripheral surface after plating, causing generation of a large number of nodules. Further, the amount of dissolution of the aluminum alloy substrate was large and a large number of concave and convex portions were generated, causing defects to be generated on the plated front surface, so that plating smoothness was unacceptable.

In Comparative Example 19, it was impossible to sufficiently remove compounds on the outer peripheral surface because of too high a concentration of $HNO_3$ in a chemical liquid used for the compound removal step, so that there were found a large number of convex portions on the end faces of the outer peripheral portion after plating, causing generation of a large number of nodules, which made Comparative Example 19 unacceptable.

In Comparative Example 20, the temperature of a chemical liquid used for the compound removal step was low so that the reaction rate was low and it was impossible to sufficiently remove compounds and sufficiently remove compounds on the outer peripheral surface. As a result, there were found a large number of convex portions on the outer peripheral surface after plating, causing generation of a large number of nodules, which made Comparative Example 20 unacceptable.

In Comparative Example 21, the temperature of a chemical liquid used for the compound removal step was high so that the reaction rate was high to produce the amount of dissolution of the aluminum alloy substrate large, causing generation of a large number of concave and convex portions. As a result, there were found a large number of convex portions on the outer peripheral surface and defects on the plated front surface after Ni—P plating, so that plating smoothness was unacceptable.

In Comparative Example 22, the reaction time was not sufficient because of a short time of the compound removal step, so that compounds were not sufficiently removed and it was impossible to sufficiently remove compounds on the outer peripheral surface. As a result, there were found a large number of convex portions on the outer peripheral surface after plating, causing generation of a large number of nodules, which made Comparative Example 22 unacceptable.

In Comparative Example 23, the reaction proceeds too much because of a long time of the compound removal step, so that the amount of dissolution of the aluminum substrate was large and a large number of concave and convex portions were generated. As a result, there were found to have been generated convex portions on the outer peripheral surface and defects on the plated front surface after Ni—P plating, so that plating smoothness was unacceptable.

2. Second Embodiment

Examples 48 to 94 and Comparative Examples 24 to 46

In the second embodiment, examples are shown in which the CC casting method was used as the method for casting an aluminum alloy.

First, each of aluminum alloys having respective compositions shown in Table 1 was melted in accordance with a usual method to prepare a molten aluminum alloy. Next, the molten aluminum alloy was cast by the CC method to produce a thin cast plate having a thickness of 6 mm. Next, the cast plate was cold-rolled to a thickness of 0.8 mm to yield a final rolled sheet. The aluminum alloy sheet thus obtained was stamped into an annular shape having an outer diameter of 98 mm and an inner diameter of 24 mm to produce an annular aluminum alloy sheet.

The annular aluminum alloy sheet thus obtained was subjected to pressure planarization and annealing under a pressure of 1.5 MPa at 300° C. for 3 hours to yield a disk blank. An aluminum alloy substrate was made by executing the steps shown in Tables 2 and 3, and an outer peripheral surface of the aluminum alloy substrate was observed for evaluation. Note that the aluminum alloy sheet was subjected to inner and outer diameters lathing such that it was formed into a shape having an outer diameter of 97 mm and an inner diameter of 25 mm.

Thereafter, the aluminum alloy substrate was subjected to plating pretreatment. First, alkaline degreasing was conducted using AD-68F (made by C. Uyemura & Co., Ltd.) with a concentration of 400 mL/L at 50° C. for 5 minutes, and then acid etching was conducted using AD-107F (made by C. Uyemura & Co., Ltd.) with a concentration of 50 mL/L at 60° C. for 3 minutes. Further, desmutting was conducted using a 30% $HNO_3$ aqueous solution at room temperature (25° C.) for 50 seconds. Then, 1st zincate treatment was conducted using a zincate treatment solution (AD-301F made by C. Uyemura & Co., Ltd.) with a concentration of 300 mL/L at 25° C. for 50 seconds. After the 1st zincate treatment, peeling of a zincate (Zn) layer was conducted using a 30% $HNO_3$ aqueous solution (25° C.) for 60 seconds, and 2nd zincate treatment was conducted using a zincate treatment solution (AD-301F made by C. Uyemura & Co., Ltd.) with a concentration of 300 mL/L at 25° C. for one minute.

On the aluminum alloy substrate subjected to the 2nd zincate treatment, electroless plating of Ni—P was conducted using an electroless Ni—P plating solution (Nimden HDX made by C. Uyemura & Co., Ltd.) at 90° C. (120 minutes) to a thickness of 14 µm, and then finish polishing was conducted using a feather cloth (one-side polishing quantity of 4 µm) to obtain an aluminum alloy base disk for evaluation. Then, evaluation was performed by observing an outer peripheral surface of the aluminum alloy base disk.

Evaluation 1: Observation of Outer Peripheral Surface After Grinding

An aluminum alloy substrate after grinding immediately before plating pretreatment was used as a sample for evaluation, and an outer peripheral surface of the aluminum alloy substrate was photographed at a magnification of 2000 times via five fields of view using a digital microscope (VHX-6000 made by Keyence Corporation). From the photographed images, the maximum diameters and number of holes were measured for evaluation. The number of holes per 1 mm² was calculated as an average of values thereof obtained via the five fields of view. When the number of holes having a maximum diameter of 10 μm or more was less than 100/mm², an evaluation of excellent (A) was given, when the same was 100/mm² or more and 200/mm² or less, an evaluation of good (B) was given, and when the same was more than 200/mm², an evaluation of poor (C) was given. "Excellent" (A) and "Good" (B) were regarded as acceptable while "Poor" (C) was regarded as unacceptable. Results are shown in Tables 6 and 7.

TABLE 6

|  | ALLOY | STEP | OUTER PERIPHERAL SURFACE OF ALUMINUM ALLOY SUBSTRATE | OUTER PERIPHERAL SURFACE OF ALUMINUM ALLOY BASE DISK | PLATING SMOOTHNESS | FLUTTERING CHARACTERISTIC |
|---|---|---|---|---|---|---|
| EXAMPLE 48 | A1 | C1 | A | A | A | A |
| EXAMPLE 49 | A1 | C10 | A | A | A | A |
| EXAMPLE 50 | A1 | C19 | A | A | A | A |
| EXAMPLE 51 | A2 | C1 | A | A | A | A |
| EXAMPLE 52 | A3 | C1 | A | A | A | A |
| EXAMPLE 53 | A4 | C1 | B | B | B | B |
| EXAMPLE 54 | A5 | C1 | B | B | B | A |
| EXAMPLE 55 | A6 | C1 | B | B | B | B |
| EXAMPLE 56 | A7 | C1 | B | B | B | A |
| EXAMPLE 57 | A8 | C1 | B | B | B | B |
| EXAMPLE 58 | A9 | C1 | B | B | B | A |
| EXAMPLE 59 | A10 | C1 | A | A | A | B |
| EXAMPLE 60 | A11 | C1 | B | B | B | A |
| EXAMPLE 61 | A12 | C1 | A | A | A | A |
| EXAMPLE 62 | A13 | C1 | B | B | B | A |
| EXAMPLE 63 | A14 | C1 | A | A | A | A |
| EXAMPLE 64 | A15 | C1 | B | B | B | A |
| EXAMPLE 65 | A16 | C1 | A | A | A | A |
| EXAMPLE 66 | A17 | C1 | A | A | A | A |
| EXAMPLE 67 | A18 | C1 | A | A | A | A |
| EXAMPLE 68 | A19 | C1 | A | A | A | A |
| EXAMPLE 69 | A20 | C1 | A | A | A | A |
| EXAMPLE 70 | A21 | C1 | B | B | B | A |
| COMPARATIVE EXAMPLE 24 | B1 | C1 | A | A | A | C |
| COMPARATIVE EXAMPLE 25 | B2 | C1 | C | C | C | A |
| COMPARATIVE EXAMPLE 26 | B3 | C1 | B | B | C | C |
| COMPARATIVE EXAMPLE 27 | B4 | C1 | C | C | C | A |
| COMPARATIVE EXAMPLE 28 | B5 | C1 | B | B | C | C |
| COMPARATIVE EXAMPLE 29 | B6 | C1 | C | C | C | A |
| COMPARATIVE EXAMPLE 30 | B7 | C1 | A | A | A | C |
| COMPARATIVE EXAMPLE 31 | B8 | C1 | C | C | C | A |
| COMPARATIVE EXAMPLE 32 | B9 | C1 | C | C | C | A |
| COMPARATIVE EXAMPLE 33 | B10 | C1 | — | — | — | — |
| COMPARATIVE EXAMPLE 34 | B11 | C1 | C | C | C | A |
| COMPARATIVE EXAMPLE 35 | B12 | C1 | C | C | C | A |

TABLE 7

|  | ALLOY | STEP | OUTER PERIPHERAL SURFACE OF ALUMINUM ALLOY SUBSTRATE | OUTER PERIPHERAL SURFACE OF ALUMINUM ALLOY BASE DISK | PLATING SMOOTHNESS | FLUTTERING CHARACTERISTIC |
|---|---|---|---|---|---|---|
| EXAMPLE 71 | A1 | C2 | A | A | A | A |
| EXAMPLE 72 | A1 | C3 | B | B | B | A |
| EXAMPLE 73 | A1 | C4 | A | A | A | A |
| EXAMPLE 74 | A1 | C5 | A | A | A | A |
| EXAMPLE 75 | A1 | C6 | B | B | B | A |
| EXAMPLE 76 | A1 | C7 | B | B | B | A |
| EXAMPLE 77 | A1 | C8 | B | B | B | A |
| EXAMPLE 78 | A1 | C9 | A | A | A | A |
| EXAMPLE 79 | A1 | C11 | A | A | A | A |

TABLE 7-continued

| | ALLOY | STEP | OUTER PERIPHERAL SURFACE OF ALUMINUM ALLOY SUBSTRATE | OUTER PERIPHERAL SURFACE OF ALUMINUM ALLOY BASE DISK | PLATING SMOOTHNESS | FLUTTERING CHARACTERISTIC |
|---|---|---|---|---|---|---|
| EXAMPLE 80 | A1 | C12 | B | B | B | A |
| EXAMPLE 81 | A1 | C13 | A | A | A | A |
| EXAMPLE 82 | A1 | C14 | A | A | A | A |
| EXAMPLE 83 | A1 | C15 | B | B | B | A |
| EXAMPLE 84 | A1 | C16 | B | B | B | A |
| EXAMPLE 85 | A1 | C17 | B | B | B | A |
| EXAMPLE 86 | A1 | C18 | A | A | A | A |
| EXAMPLE 87 | A1 | C20 | A | A | A | A |
| EXAMPLE 88 | A1 | C21 | B | B | B | A |
| EXAMPLE 89 | A1 | C22 | A | A | A | A |
| EXAMPLE 90 | A1 | C23 | A | A | A | A |
| EXAMPLE 91 | A1 | C24 | B | B | B | A |
| EXAMPLE 92 | A1 | C25 | B | B | B | A |
| EXAMPLE 93 | A1 | C26 | B | B | B | A |
| EXAMPLE 94 | A1 | C27 | A | A | A | A |
| COMPARATIVE EXAMPLE 36 | A1 | D1 | A | C | B | A |
| COMPARATIVE EXAMPLE 37 | A1 | D2 | A | C | B | A |
| COMPARATIVE EXAMPLE 38 | A1 | D3 | A | C | B | A |
| COMPARATIVE EXAMPLE 39 | A1 | D4 | B | C | B | A |
| COMPARATIVE EXAMPLE 40 | A1 | D5 | C | C | C | A |
| COMPARATIVE EXAMPLE 41 | A1 | D6 | B | C | C | A |
| COMPARATIVE EXAMPLE 42 | A1 | D7 | B | C | B | A |
| COMPARATIVE EXAMPLE 43 | A1 | D8 | B | C | B | A |
| COMPARATIVE EXAMPLE 44 | A1 | D9 | C | C | C | A |
| COMPARATIVE EXAMPLE 45 | A1 | D10 | B | C | B | A |
| COMPARATIVE EXAMPLE 46 | A1 | D11 | C | C | C | A |

Evaluation 2: Observation of Outer Peripheral Surface of Aluminum Alloy Base Disk After Electroless Ni—P Plating An aluminum alloy base disk after electroless Ni—P plating was used as a sample for evaluation, and an outer peripheral surface of the aluminum alloy base disk was photographed at a magnification of 1000 times via five fields of view using an SEM. From the photographed images, the maximum diameters and number of convex portions were measured for evaluation. The number of convex portions per 1 mm$^2$ was calculated as an average of values thereof obtained via the five fields of view. When the number of convex portions having a maximum diameter of 4 to 10 μm was less than 150/mm$^2$, an evaluation of "Excellent" (A) was given, when the same was 150/mm$^2$ or more and 300/mm$^2$ or less, an evaluation of "Good" (B) was given, and when the same was more than 300/mm$^2$, an evaluation of "Poor" (C) was given. "Excellent" (A) and "Good " (B) were regarded as acceptable and "Poor" (C) was regarded as unacceptable. Results are shown in Tables 4 and 5.

Evaluation 3: Plating Smoothness

An aluminum alloy base disk after electroless Ni—P plating was used as a sample for evaluation, and was immersed in a 50% by volume solution of nitric acid at 50° C. for three minutes to etch the Ni—P plated front surface. Five fields of view of the etched Ni—P plated front surface were photographed using an SEM at a magnification of 5000 times. Note that the area of each field of view was set at 536 The numbers of plating defects were measured based on images obtained by photographing the five fields of view, and the arithmetic mean value of values obtained via the five fields of view was determined. When the arithmetic mean value was less than 5 per field of view, an evaluation of "Excellent" (A) was given, when the same was 5 or more and less than 10 per field of view, an evaluation of "Good" (B) was given, and when the same was 10 or more per field of view, an evaluation of "Poor" (C) was given. "Excellent" (A) and "Good" (B) were regarded as acceptable while "Poor" (C) was regarded as unacceptable. Results are shown in Tables 6 and 7.

Evaluation 4: Fluttering Characteristic

The aluminum alloy base disk after electroless Ni—P plating and surface polishing was used as a sample for evaluation of a fluttering characteristic. Note that evaluation should be performed on a magnetic disk having a magnetic substance applied thereto, as a product, but it was already confirmed that results of evaluation of aluminum alloy base disks do not differ from those of evaluation of magnetic disks.

The fluttering characteristic was evaluated by placing the sample for evaluation on a commercially available hard disk drive in the presence of air. ST2000 (trade name) manufactured by Seagate Technology Inc. was used as the hard disk drive, and a motor to which SLD102 (trade name) manufactured by Techno Alive Co. was directly connected was driven. The rotational speed of the motor was set to 7200 rpm, and a plurality of disks were always set to observe the vibrations of a surface of the top magnetic disk of each disk using LDV1800 (trade name), which is a laser Doppler meter manufactured by ONO SOKKI CO., LTD. The observed vibrations were subjected to spectrum analysis using an FFT analysis apparatus DS3200 (trade name) manufactured by ONO SOKKI CO., LTD. The observation was performed by observing the disk surface through a hole formed in the lid of the hard disk drive. In addition, the evaluation was performed by removing a squeeze plate set in the commercially available hard disk.

A fluttering characteristic was evaluated with the maximum displacement (disk fluttering (nm)) of a broad peak in an approximate range of 300 to 1500 Hz at which fluttering appears. Such a broad peak, referred to as non-repeatable run out (NRRO), is known to have a significant influence on the positioning error of a head. As evaluation of a fluttering characteristic in air, when the maximum displacement is 30 nm or less, an evaluation of "Excellent" (A) was given, when the same was more than 30 nm and 50 nm or less, an evaluation of "Good" (B) was given, and when the same was more than 50 nm, an evaluation of "Poor" (C) was given. "Excellent" (A) and "Good" (B) were regarded as acceptable while "Poor" (C) was regarded as unacceptable. Results are shown in Tables 6 and 7.

Examples 48 to 70 and Comparative Examples 24 to 35 are examples with the varying compositions of aluminum alloys, while Examples 71 to 94 and Comparative Examples 36 to 46 are examples with varying steps of treatment of aluminum alloy substrates.

In Examples 48 to 94, all evaluation results were acceptable because the alloy compositions and the conditions of the compound removal step thereof were within the scope of the present disclosure.

In Comparative Example 24, the number of second phase particles was small because of the small content of Fe, so that the fluttering characteristic was unacceptable.

In Comparative Example 25, the amount of coarse Al—Fe-based compounds was large because of the large content of Fe, so that a large number of holes were found after the compound removal step and accordingly a large number of convex portions were also found after Ni—P plating. As a result, plating smoothness was unacceptable.

In Comparative Example 26, the number of second phase particles was small because of the small content of Cu, so that the fluttering characteristic was unacceptable. Further, plating smoothness was unacceptable because a zincate film was non-uniform and defects were generated on the plated front surface.

In Comparative Example 27, the amount of coarse Al—Cu-based compounds was large because of the large content of Cu, so that a large number of holes were found after the compound removal step and accordingly a large number of convex portions were also found after Ni—P plating. As a result, plating smoothness was unacceptable.

In Comparative Example 28, the number of second phase particles was small because of the small content of Zn, so that the fluttering characteristic was unacceptable. In addition, a zincate film was non-uniform, so that defects were generated on the plated front surface, and therefore plating smoothness was also unacceptable.

In Comparative Example 29, the potential of a parent phase was too electronegative because of the large content of Zn, and therefore, the parent phase was intensively dissolved in each step of plating treatment, causing generation of a large number of concave and convex portions. As a result, there were found to have been generated convex portions on the outer peripheral surface and defects on the plated front surface after Ni—P plating, so that plating smoothness was unacceptable.

In Comparative Example 30, the number of second phase particles was small because of the small content of Mn, so that the fluttering characteristic was unacceptable.

In Comparative Example 8, the amount of coarse Al—Mn-based compounds was large because of the large content of Mn, so that a large number of holes were found after the compound removal step and accordingly a large number of convex portions were also found after Ni—P plating. As a result, plating smoothness was unacceptable.

In Comparative Example 32, the number of coarse Si particles was large because of the large content of Si, and it was impossible to remove the coarse Si particles even if the compound removal step was applied. Therefore, there were found to have been generated convex portions on the outer peripheral surface and defects on the plated front surface after Ni—P plating, so that plating smoothness was unacceptable.

In Comparative Example 33, it was impossible to perform rolling because of the large content of Ni, so that it was impossible to obtain a sample for evaluation.

In Comparative Example 34, the amount of coarse Al—Cr-based compounds was large because of the large content of Cr, and it was impossible to remove the coarse Al—Cr-based compounds even if the compound removal step was applied. Therefore, there were found to have been generated convex portions on the outer peripheral surface and defects on the plated front surface after Ni—P plating, so that plating smoothness was unacceptable.

In Comparative Example 35, the amount of coarse Al—Zn-based compounds was large because of the large content of Zn, and it was impossible to remove the coarse Al—Zn-based compounds even if the compound removal step was applied. Therefore, there were found to have been generated convex portions on the outer peripheral surface and defects on the plated front surface after Ni—P plating, so that plating smoothness was unacceptable.

In Comparative Examples 36 to 38, the compound removal step was not applied. As a result, although plating smoothness was good due to polishing of the surface, a large number of convex portions were found on the outer peripheral surface after plating, causing generation of a large number of nodules, so that each Comparative Example was unacceptable.

In Comparative Example 39, it was impossible to sufficiently remove compounds on the outer peripheral surface because of a low concentration of HF in a chemical liquid used for the compound removal step, so that there were found a large number of convex portions on the outer peripheral surface after plating, causing generation of a large number of nodules, which made Comparative Example 39 unacceptable.

In Comparative Example 40, the amount of dissolution of the aluminum alloy substrate was large because of a high concentration of HF in a chemical liquid used for the compound removal step, and a large number of concave and convex portions were generated, so that there were found a large number of convex portions on the outer peripheral surface and defects on the plated front surface after Ni—P plating, which made plating smoothness unacceptable.

In Comparative Example 41, it was impossible to sufficiently remove compounds on the outer peripheral surface because of a low concentration of HF in a chemical liquid used for the compound removal step, so that there were found a large number of convex portions on the outer peripheral surface after plating, causing generation of a large number of nodules. Further, the amount of dissolution of the aluminum alloy substrate was large and a large number of concave and convex portions were generated, causing defects to be generated on the plated front surface, which made plating smoothness unacceptable.

In Comparative Example 42, it was impossible to sufficiently remove compounds on the outer peripheral surface because of too high a concentration of $HNO_3$ in a chemical liquid used for the compound removal step, so that there were found a large number of convex portions on the end faces of the outer peripheral portion after plating, causing generation of a large number of nodules, which made Comparative Example 42 unacceptable.

In Comparative Example 43, the temperature of a chemical liquid used for the compound removal step was low so that the reaction rate was low and it was impossible to sufficiently remove compounds and sufficiently remove compounds on the outer peripheral surface. As a result, there were found a large number of convex portions on the outer peripheral surface after plating, causing generation of a large number of nodules, which made Comparative Example 43 unacceptable.

In Comparative Example 44, the temperature of a chemical liquid used for the compound removal step was high so that the reaction rate was high to produce the amount of dissolution of the aluminum alloy substrate large, causing generation of a large number of concave and convex portions. As a result, there were found a large number of convex portions on the outer peripheral surface and defects on the plated front surface after Ni—P plating, so that plating smoothness was unacceptable.

In Comparative Example 45, the reaction time was not sufficient because of a short time of the compound removal step, so that compounds were not sufficiently removed and it was impossible to sufficiently remove compounds on the outer peripheral surface. As a result, there were found a large number of convex portions on the outer peripheral surface, causing generation of a large number of nodules, which made Comparative Example 45 unacceptable.

In Comparative Example 46, the reaction proceeds too much because of a long time of the compound removal step, so that the amount of dissolution of the aluminum substrate was large, causing generation of a large number of concave and convex portions. As a result, there were found to have been generated convex portions on the outer peripheral surface and defects on the plated front surface after Ni—P plating, so that plating smoothness was unacceptable.

INDUSTRIAL APPLICABILITY

By providing an aluminum alloy base disk for a magnetic disk substrate, which has features of reduced disk flutter and reduced defects on an electroless Ni—P plated front surface, it is possible to provide a magnetic disk that enables the number of mounted magnetic disks to be increased due to thinning of each magnetic disk and a storage capacity per magnetic disk to be increased, to thereby contributing to the higher capacity of an HDD

The invention claimed is:

1. An aluminum alloy substrate for a magnetic disk, comprising an aluminum alloy containing 0.1 to 3.0 mass % of Fe, 0.005 to 1.000 mass % of Cu, 0.005 to 1.000 mass % of Zn, and optionally one or more elements selected from a group comprising 0.1 to 3.0 mass % of Mn, 0.1 to 3.0 mass % of Si, 0.1 to 8.0 mass % of Ni, 0.01 to 1.00 mass % of Cr, and 0.01 to 1.00 mass % of Zr, and optionally one or more elements selected from a group comprising Ti, B, and V, of which a total content is 0.005 to 0.500 mass %, with a balance of Al and inevitable impurities, wherein in an outer peripheral surface thereof, the number of holes having maximum diameters of 10 μm or more is 200/mm$^2$ or less.

2. An aluminum alloy base disk for a magnetic disk, including an electroless Ni-P plated layer on the aluminum alloy substrate for a magnetic disk, according to claim 1, wherein in an outer peripheral surface thereof, the number of convex portions having maximum diameters of 4 to 10 μm is 300/mm$^2$ or less.

3. A magnetic disk including a magnetic substance layer on a surface of the aluminum alloy base disk for a magnetic disk, according to claim 2.

4. A method for manufacturing the aluminum alloy substrate for a magnetic disk, according to claim 1, comprising a semi-continuous casting step of semi-continuously casting an ingot, using the aluminum alloy, a hot rolling step of hot rolling the ingot, a cold rolling step of cold rolling the hot-rolled plate, a disk blank-stamping step of stamping the cold-rolled sheet into an annular disk blank, a pressure planarization and annealing step of pressure annealing the disk blank formed by stamping, an inner and outer diameter machining step of machining an inner peripheral surface and an outer peripheral surface of the pressure-annealed disk blank, a stress relief heat treatment step of applying stress relief heat to the disk blank subjected to inner and outer diameter machining, a compound removal step of removing compounds on a surface of the disk blank subjected to stress relief heat treatment, and a grinding step of grinding the disk blank subjected to compound removal, wherein the compound removal step comprises immersing the disk blank in a mixed solution of $NHO_3$ and HF, which is a 10 to 60 mass % of a $NHO_3$ solution at 10 to 30° C. and contains 10 to 80 g/L of HF, for 5 to 60 seconds.

5. A method for manufacturing the aluminum alloy substrate for a magnetic disk, according to claim 1, comprising a semi-continuous casting step of semi-continuously casting an ingot, using the aluminum alloy, a hot rolling step of hot rolling the ingot, a cold rolling step of cold rolling the hot-rolled plate, a disk blank-stamping step of stamping the cold-rolled sheet into an annular disk blank, a pressure planarization and annealing step of pressure annealing the disk blank formed by stamping, inner and outer diameter machining step of machining an inner peripheral surface and an outer peripheral surface of the pressure-annealed disk blank, a pre-griding step of pre-grinding the disk blank subjected to inner and outer diameter machining, a stress relief heat treatment step of applying stress relief heat to the disk blank subjected to pre-grinding, a compound removal step of removing compounds on a surface of the disk blank subjected to stress relief heat treatment, and a grinding step of grinding the disk blank subjected to compound removal, wherein the compound removal step comprises immersing the disk blank in a mixed solution of $NHO_3$ and HF, which is a 10 to 60 mass % of a $NHO_3$ solution at 10 to 30° C. and contains 10 to 80 g/L of HF, for 5 to 60 seconds.

6. A method for manufacturing the aluminum alloy substrate for a magnetic disk, according to claim 1, comprising a semi-continuous casting step of semi-continuously casting an ingot, using the aluminum alloy, a hot rolling step of hot rolling the ingot, a cold rolling step of cold rolling the hot-rolled plate, a disk blank-stamping step of stamping the cold-rolled sheet into an annular disk blank, a pressure planarization and annealing step of pressure annealing the disk blank formed by stamping, inner and outer diameter machining step of machining an inner peripheral surface and an outer peripheral surface of the pressure-annealed disk blank, a lathing step of lathing the disk blank subjected to inner and outer diameter machining, a stress relief heat treatment step of applying stress relief heat to the disk blank subjected to lathing, a compound removal step of removing compounds on a surface of the disk blank subjected to stress relief heat treatment, and a grinding step of grinding the disk blank subjected to compound removal, wherein the compound removal step comprises immersing the disk blank in a mixed solution of $NHO_3$ and HF, which is a 10 to 60 mass % of a $NHO_3$ solution at 10 to 30° C. and contains 10 to 80 g/L of HF, for 5 to 60 seconds.

7. A method for manufacturing the aluminum alloy substrate for a magnetic disk, according to claim 1, comprising a continuous casting step of continuously casting an ingot, using the aluminum alloy, a cold rolling step of cold rolling the ingot, a disk blank-stamping step of stamping the cold-rolled sheet into an annular disk blank, a pressure planarization and annealing step of pressure annealing the disk blank formed by stamping, inner and outer diameter machining step of machining an inner peripheral surface and an outer peripheral surface of the pressure-annealed disk blank, a stress relief heat treatment step of applying stress relief heat to the disk blank subjected to inner and outer diameter machining, a compound removal step of removing compounds on a surface of the disk blank subjected to stress relief heat treatment, and a grinding step of grinding the disk blank subjected to compound removal, wherein the compound removal step comprises immersing the disk blank in a mixed solution of $NHO_3$ and HF, which is a 10 to 60 mass % of a $NHO_3$ solution at 10 to 30° C. and contains 10 to 80 g/L of HF, for 5 to 60 seconds.

8. A method for manufacturing the aluminum alloy substrate for a magnetic disk, according to claim 1, comprising a continuous casting step of continuously casting an ingot, using the aluminum alloy, a cold rolling step of cold rolling the ingot, a disk blank-stamping step of stamping the cold-rolled sheet into an annular disk blank, a pressure planarization and annealing step of pressure annealing the disk blank formed by stamping, inner and outer diameter machining step of machining an inner peripheral surface and an outer peripheral surface of the pressure-annealed disk blank, a pre-grinding step of pre-grinding the disk blank subjected to inner and outer diameter machining, a stress relief heat treatment step of applying stress relief heat to the disk blank subjected to pre-grinding, a compound removal step of removing compounds on a surface of the disk blank subjected to stress relief heat treatment, and a grinding step of grinding the disk blank subjected to compound removal, wherein the compound removal step comprises immersing the disk blank in a mixed solution of $NHO_3$ and HF, which is a 10 to 60 mass % of a $NHO_3$ solution at 10 to 30° C. and contains 10 to 80 g/L of HF, for 5 to 60 seconds.

9. A method for manufacturing the aluminum alloy substrate for a magnetic disk, according to claim 1, comprising a continuous casting step of continuously casting an ingot, using the aluminum alloy, a cold rolling step of cold rolling the ingot, a disk blank-stamping step of stamping the cold-rolled sheet into an annular disk blank, a pressure planarization and annealing step of pressure annealing the disk blank formed by stamping, inner and outer diameter machining step of machining an inner peripheral surface and an outer peripheral surface of the pressure-annealed disk blank, a lathing step of lathing the disk blank subjected to inner and outer diameter machining, a stress relief heat treatment step of applying stress relief heat to the disk blank subjected to lathing, a compound removal step of removing compounds on a surface of the disk blank subjected to stress relief heat treatment, and a grinding step of grinding the disk blank subjected to compound removal, wherein the compound removal step comprises immersing the disk blank in a mixed solution of $NHO_3$ and HF, which is a 10 to 60 mass % of a $NHO_3$ solution at 10 to 30° C. and contains 10 to 80 g/L of HF, for 5 to 60 seconds.

\* \* \* \* \*